US008150236B2

(12) United States Patent  (10) Patent No.: US 8,150,236 B2
Fujiwara  (45) Date of Patent: Apr. 3, 2012

(54) DATA RECORDING APPARATUS, DATA RECORDING METHOD AND PROGRAM

(75) Inventor: Kazunari Fujiwara, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/001,933

(22) PCT Filed: Jun. 26, 2009

(86) PCT No.: PCT/JP2009/002958
§ 371 (c)(1),
(2), (4) Date: Dec. 29, 2010

(87) PCT Pub. No.: WO2010/001566
PCT Pub. Date: Jan. 7, 2010

(65) Prior Publication Data
US 2011/0116768 A1   May 19, 2011

(30) Foreign Application Priority Data

Jul. 2, 2008 (JP) ................................. 2008-172979

(51) Int. Cl.
*H04N 5/93* (2006.01)
(52) U.S. Cl. ...................................................... 386/279
(58) Field of Classification Search .................. None
See application file for complete search history.

(56) References Cited

U.S. PATENT DOCUMENTS 6,034,832 A * 3/2000 Ichimura et al. ............. 360/60
6,965,975 B2 * 11/2005 Jeong ........................... 711/161

2003/0152368 A1  8/2003 Kitani
2005/0273632 A1 12/2005 Kawakami
2006/0039260 A1  2/2006 Hirasawa

FOREIGN PATENT DOCUMENTS

| JP | 11-176084 | 7/1999 |
| JP | 2001-351322 | 12/2001 |
| JP | 2002-367292 | 12/2002 |
| JP | 2008-005033 | 1/2008 |

OTHER PUBLICATIONS

International Search Report issued Aug. 18, 2009 in corresponding International Application No. PCT/JP2009/002958.

* cited by examiner

*Primary Examiner* — William C Vaughn, Jr.
*Assistant Examiner* — Heather Jones
(74) *Attorney, Agent, or Firm* — Wenderoth, Lind & Ponack, L.L.P.

(57) ABSTRACT

A data recording apparatus (101) in the present invention includes: a data recording unit (13) that records and holds AV data supported by a copyright protection system permitting multiple times dubbing; a media recording unit (17) that performs dubbing or moving of the AV data between storage medium and the data recording unit (13), or between storage medium and different storage medium; a dubbing management information management unit (14) that manages dubbing management information for the AV data; and a media determination unit (18) that determines whether the storage medium is rewritable or non-rewritable based on the media type of storage medium. When the media recording unit (17) performs moving of the AV data from the data recording unit (13) to the storage medium, the dubbing management information management unit (14) updates the dubbing management information management unit (14) corresponding to the AV data according to the determination result.

7 Claims, 17 Drawing Sheets

FIG. 10A

| Media identifier | Media type | AV data name | Remaining number of times |
|---|---|---|---|
| HDD-0001 | HDD | Movie | 10 |
| HDD-0001 | HDD | Soccer | 10 |
| HDD-0001 | HDD | Drama | 8 |
| HDD-0001 | HDD | Non-fiction | 8 |
| HDD-0001 | HDD | News | 8 |

FIG. 10B

| Media identifier | Media type | AV data name | Remaining number of times |
|---|---|---|---|
| DVD-RAM-0001 | DVD-RAM | Movie | 10 |
| DVD-R-0001 | DVD-R | Soccer | 9 |
| HDD-0001 | HDD | Drama | 8 |
| HDD-0001 | HDD | Non-fiction | 8 |
| HDD-0001 | HDD | News | 8 |

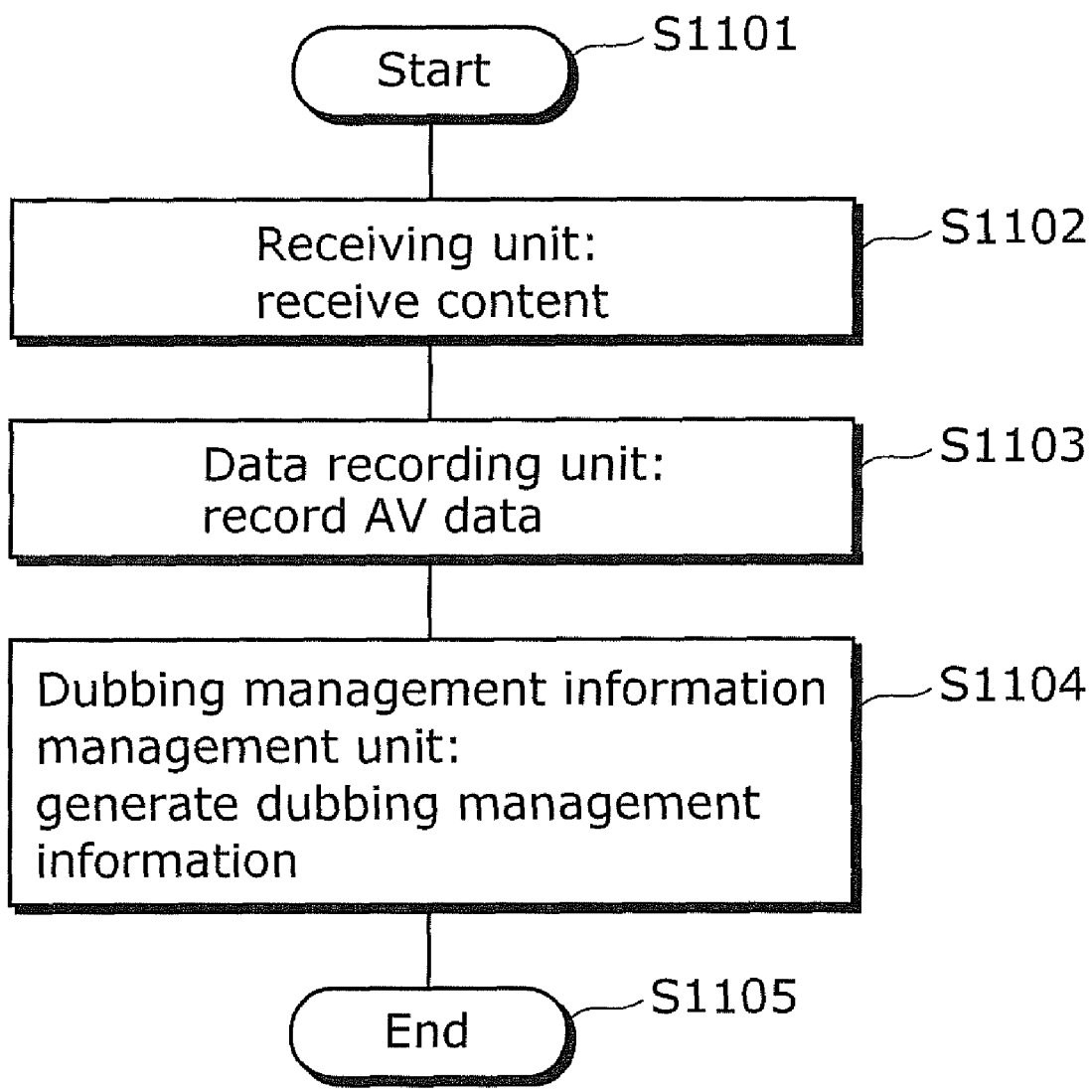

FIG. 17

```
Start
  │
  ▼
S1701 Media recording unit:
      copy AV data to other storage
      media
  │
  ▼
S1702 Dubbing management information
      management unit:
      subtract 1 from remaining
      number of times of dubbing
  │
  ▼
S1703 Remaining
      number of times of dubbing is 0,
      or 1, or greater?
       ├── 1 or greater ──────────────────────────┐
       │                                          │
       0                                          │
       ▼                                          │
S1704 What is media type?                         │
       ├── Write once read many ──────────────────┤
       │                                          │
       Rewritable                                 │
       ▼                                          │
S1706 Media recording unit:                       │
      delete AV data                              │
       │                                          │
       ▼                                          ▼
                         S1707 End
```

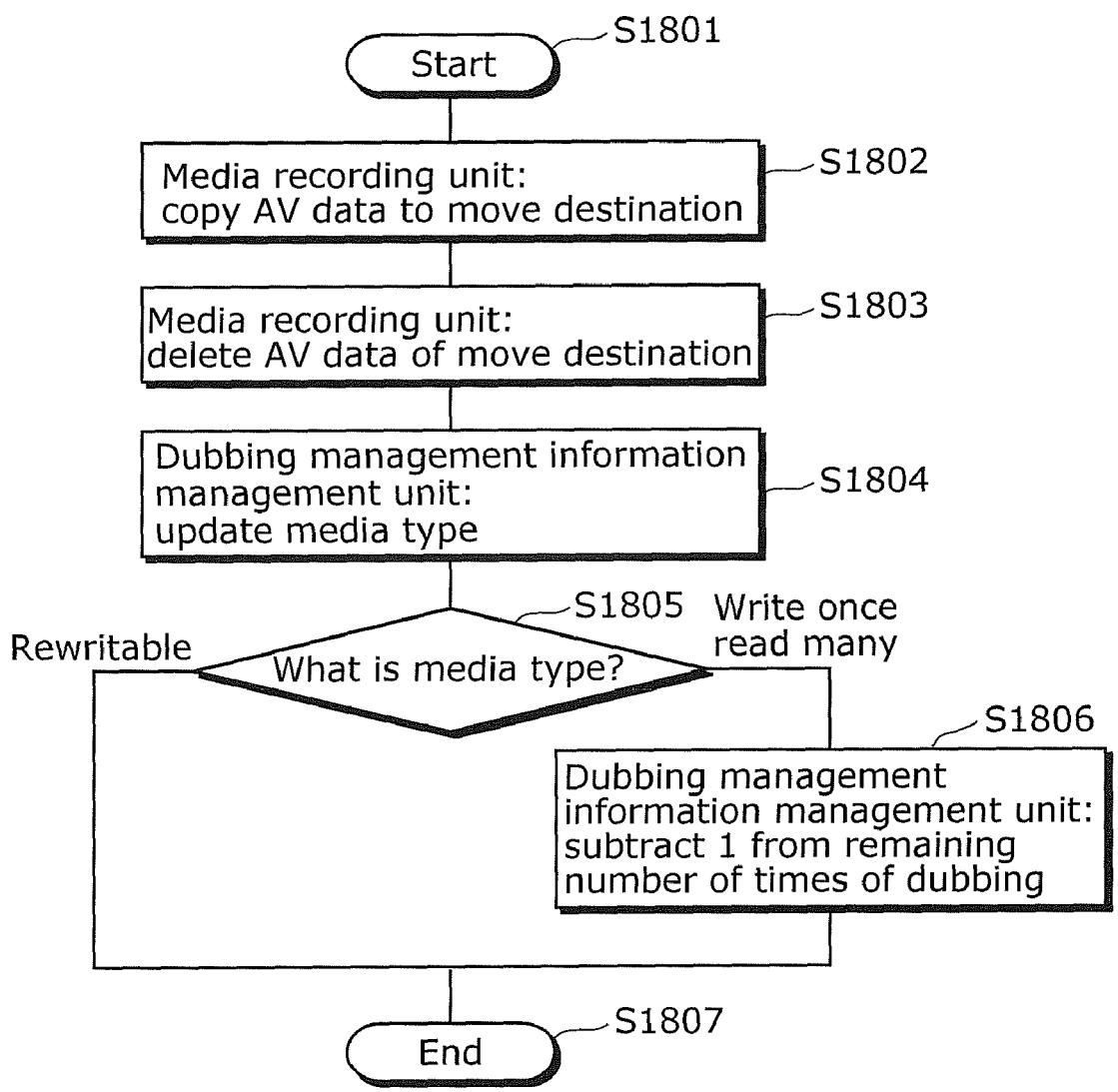

DATA RECORDING APPARATUS, DATA RECORDING METHOD AND PROGRAM

TECHNICAL FIELD

The present invention relates to a data recording apparatus, a data recording method, and a program, and particularly, to a technology for dubbing digital content supported by a copyright protection system permitting multiple dubbing.

BACKGROUND ART

In recent years, along with the widespread use of video recording devices supporting digital broadcast (hereinafter, referred to as a data recording apparatus), large volumes of digital content (hereinafter, referred to as AV (Audio and Visual) data) is increasingly stored in households.

Also, such audio-visual style is becoming common where recorded AV data is moved to storage medium such as a DVD (Digital Versatile Disk), a BD (Blu-ray Disc), and an SD memory card (Secure Digital Memory Card) which is portable and has a capacity capable of storing AV data so that the moved AV data is played with other digital household electrical appliances, PCs (Personal Computer) and portable devices for enjoyment.

Here, move is AV data replication method, in which after a copy of AV data is created in storage medium, the original AV data which is recorded in, for example, a HDD (Hard Disk Drive) is deleted.

In such a technological trend, an operation of Dubbing 10 system started in the digital terrestrial broadcast in June, 2008. The Dubbing 10 system is to relax the operation of the copy-once system that is one of the existing copyright protection systems, and permits creation of a copy of AV data only once, specifically, the Dubbing 10 system permits 9 times AV data copy and 1 time MOVE.

Because the service of the AV data supported by such copyright protection systems permitting multiple times dubbing (hereinafter, referred to as a multiple times dubbing support) has started, users will be able to enjoy viewing and listening to the AV data by using various digital household electrical appliances more than before.

In a copyright protection system supporting multiple times dubbing such as the Dubbing 10 system, in the case where the AV data supported for multiple times dubbing recorded in a data recording apparatus is moved to storage medium in a condition that the remaining permitted number of times of dubbing (hereinafter, referred to as a permitted number of times of dubbing) is not zero (for example, in a condition that dubbing has been performed at most 8 times in the Dubbing 10 system), a user can dub the AV data moved to the storage medium to other data recording apparatuses and storage medium for the remaining permitted number of times of dubbing.

PTL 1 discloses a conventional technology that manages the permitted number of times of dubbing of AV data recorded in storage medium.

In the conventional technology disclosed by PTL 1, when AV data is copied as a dubbing operation to a storage medium, the management information related to the copying is written to the storage medium along with the AV data. Further, when the AV data recorded in the storage medium is copied to other devices or storage media as an dubbing operation, the permitted number of times of dubbing can be managed by updating the management information related to copying, which was written when the AV data was copied.

CITATION LIST

[Patent Literature]
[PTL 1]
Japanese Unexamined Patent Application Publication No. 2002-367292

SUMMARY OF INVENTION

Technical Problem

In a conventional technology such as the one disclosed in the above-mentioned PTL 1, however, the management information related to copying written to a storage medium along with AV data, i.e., the management information related to the permitted number of times of dubbing is needed to be updated. Thus, in the case of storage medium such as a DVD-R (Digital Versatile Disk Recordable) which can be written to only once, or storage medium in which the management information related to copying (dubbing) such as the permitted number of times of dubbing cannot be written, there is a problem in that the information related to the permitted number of times of dubbing cannot be managed.

In addition, unlike rewritable storage medium such as a DVD-RAM (Digital Versatile Disk Random Access Memory), in the case where AV data is moved to a non-rewritable storage medium such as a DVD-R, the last move of the AV data cannot be performed. In a conventional technology such as the one disclosed in the above-mentioned PTL 1, there is a problem in that management of the permitted number of times of dubbing in the consideration of whether the type of the storage medium is non-rewritable or rewritable cannot be made for the AV data supported for multiple times dubbing.

The present invention has been conceived in order to solve the above-mentioned problems, and it is an object of the invention to provide a data recording apparatus capable of managing the information related to the permitted number of times of dubbing of AV data according to the type of storage medium.

Solution to Problem

In order to achieve the above-mentioned object, the data recording apparatus according to an aspect of the present invention includes: a record holding unit configured to record and hold AV data supported by a copyright protection system permitting multiple times dubbing; a media recording unit configured to perform dubbing or moving of AV data between at least one storage medium which is portable with a capacity capable of storing AV data, and the record holding unit, or between the storage medium and another storage medium different from the storage medium; a dubbing management unit configured to manage dubbing management information for the AV data, the dubbing management information including a permitted number of times of dubbing which is assigned in accordance with the copyright protection system; and a media determination unit configured to determine whether a storage medium is rewritable or non-rewritable based on the media type of the storage medium which is a destination of dubbing or moving of the AV data performed by the media recording unit, wherein the dubbing management unit is configured to update the dubbing management information corresponding to the AV data according to the determination result, when the media recording unit moves the AV data from the record holding unit to the storage medium.

According to this configuration, a data recording apparatus capable of managing the information related to the permitted number of times of dubbing of AV data according to the type of storage medium can be achieved.

Specifically, the media determination unit determines whether the storage medium is rewritable or not, then the remaining permitted number of times of dubbing is updated according to the determination result. Thereby, a user can precisely recognize the remaining permitted number of times of dubbing, i.e., the remaining number of times of copying without paying attention to the difference in type of the storage medium.

Alternatively, in the case where the media recording unit determines that the storage medium is non-rewritable based on the media type of the storage medium, the above-mentioned dubbing management unit may update the dubbing management information according to the determination result by subtracting at least 1 from the value of the permitted number of times of dubbing corresponding to the AV data while performing the move by the media recording unit.

Also, the dubbing management unit may subtract 1 from the permitted number of times of dubbing based on the determination result.

Alternatively, in the case where the media recording unit determines that the storage medium is rewritable based on the media type of the storage medium, the above-mentioned dubbing management unit may update the dubbing management information according to the determination result by maintaining the value of the permitted number of times of dubbing corresponding to the AV data while performing the move by the media recording unit.

Furthermore, in order to achieve the above-mentioned object, the data recording method according to an aspect of the present invention is a method for a data recording apparatus, including: recording and holding AV data supported by a copyright protection system permitting multiple times dubbing in a recording medium provided to the data recording apparatus; performing dubbing or moving of AV data between at least one storage medium which is portable with a capacity capable of storing AV data, and the recording medium, or between the storage medium and another storage medium different from the storage medium; managing dubbing management information for the AV data, the information including the permitted number of times of dubbing which is assigned in accordance with the copyright protection system; and determining whether the storage medium is rewritable or non-rewritable based on a media type of the storage medium which is a destination of dubbing or moving of the AV data in the performing dubbing or moving, wherein in the managing, the dubbing management information corresponding to the AV data according to the determination result is updated when the AV data is moved from the record holding unit to the storage medium in the performing dubbing or moving of AV data.

The present invention may be implemented not only as an apparatus, or as a method defined by replacing the processing units included in the apparatus by corresponding steps, but also as a program for a computer to execute those steps, or as information, data, or signal to represent the program. And these programs, information, data, and signals may be distributed via a recording medium such as a CD-ROM, or via a communication medium such as the Internet.

Advantageous Effects of Invention

According to the present invention, a data recording apparatus capable of managing the information related to the permitted number of times of dubbing of AV data according to the type of storage medium can be achieved.

Specifically, even in non-rewritable storage medium which can be written to only once, or storage medium for which management information such as a permitted number of times of dubbing cannot be updated, dubbing management information such as a permitted number of times of dubbing for AV data supported for multiple times dubbing can be managed.

BRIEF DESCRIPTION OF DRAWINGS

FIG. 10A is a diagram conceptually showing the dubbing management information managed by a data recording apparatus according to the embodiment of the present invention.

FIG. 10B is a diagram conceptually showing the dubbing management information managed by a data recording apparatus according to the embodiment of the present invention.

FIG. 11 is a flowchart showing the recording operation of digital broadcast by a data recording apparatus according to the embodiment of the present invention.

FIG. 17 is a flowchart showing the flow of dubbing processing to another storage medium from storage medium in the embodiment of the present invention.

FIG. 18 is a flowchart showing the flow of move processing to another storage medium from storage medium in the embodiment of the present invention.

DESCRIPTION OF EMBODIMENTS

In the following, preferred embodiments of the present invention are described with reference to the drawings.

Embodiment 1

In Embodiment 1, AV data supported by the Dubbing 10 system in the digital terrestrial broadcast is described by way of example as AV data supported for multiple times dubbing.

Figure 1:
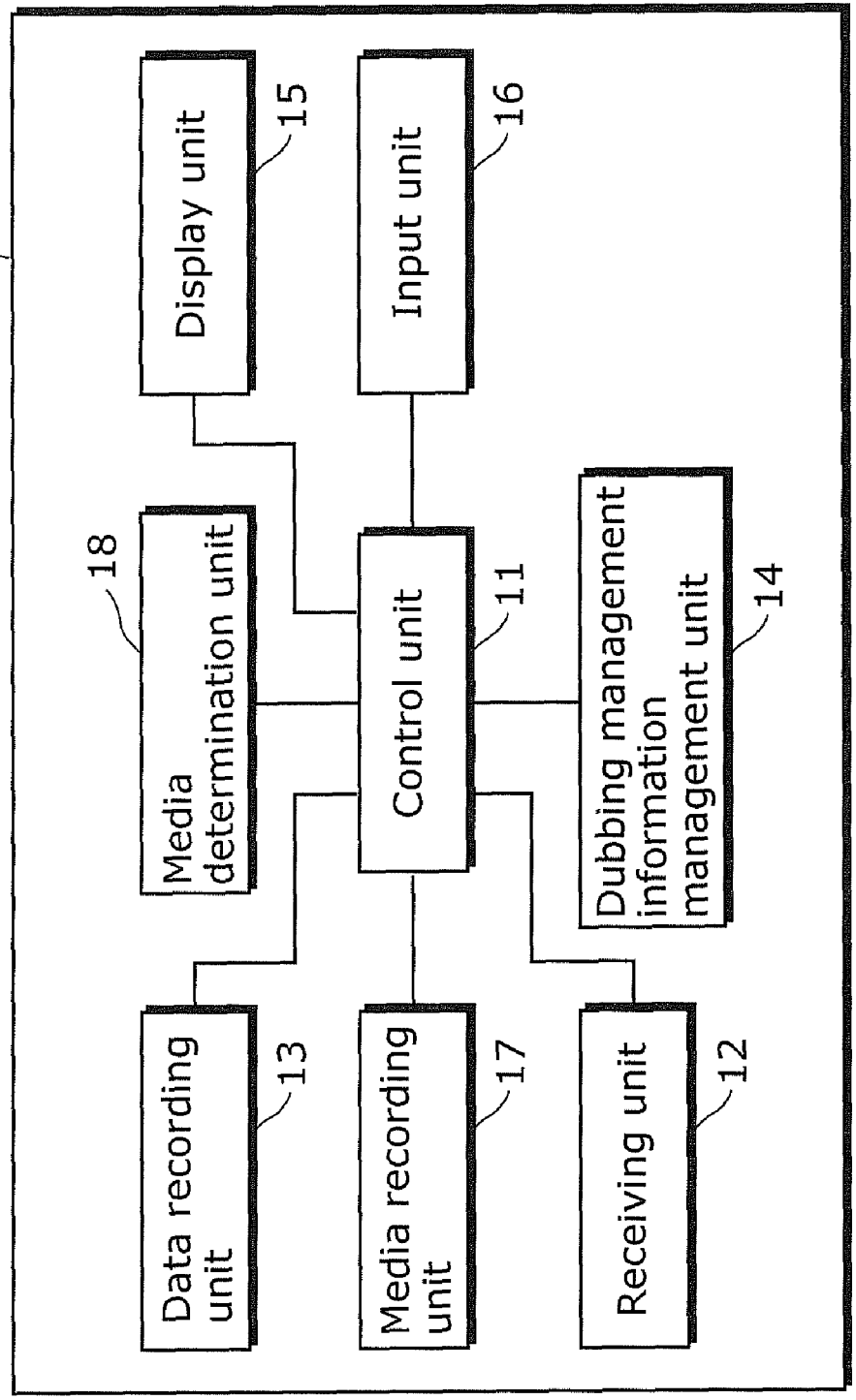
FIG. 1 is a block diagram showing the configuration of a data recording apparatus according to an embodiment of the present invention.

First, the configuration of a data recording apparatus 101 in Embodiment 1 is described. FIG. 1 is a block diagram showing the configuration of the data recording apparatus according to Embodiment 1.

In FIG. 1, the data recording apparatus 101 includes a control unit 11, a receiving unit 12, a data recording unit 13, a dubbing management information management unit 14, a display unit 15, an input unit 16, a media recording unit 17, and a media determination unit 18.

The control unit 11 controls the operation of each block (each unit) in the data recording apparatus 101.

The receiving unit 12 has a tuner function, thus receives and tunes in digital broadcast. The receiving unit 12 decodes and outputs the audio/visual data of the tuned digital broadcast. The receiving unit 12 also extracts information from SI/PSI (Service Information/Program Specific Information) included in the digital broadcast, the information indicating whether the AV data can be copied multiple times or not, i.e., the information indicating whether the AV data is supported by the Dubbing 10 system (the AV data is supported for multiple times dubbing) or not.

The data recording unit 13 includes, for example, a HDD, or a flash memory, and records the AV data which is the audio/visual data outputted by the receiving unit 12. Here, the data recording unit 13 corresponds to the record holding unit according to the present invention.

The dubbing management information management unit 14 generates and manages the dubbing management information of the AV data. That is to say, the dubbing management information management unit 14 manages the dubbing management information including the permitted number of times of dubbing which is assigned to the AV data recorded in the data recording unit 13 in accordance with the Dubbing 10 system. In addition, the dubbing management information management unit 14 manages not only the dubbing management information related to the AV data recorded in the data recording unit 13, but also the dubbing management information of all the AV data after copied or moved from the data recording unit 13 to storage medium.

For example, when the media recording unit 17 moves the AV data from the data recording unit 13 to the storage medium, the dubbing management information management unit 14 manages, specifically updates the dubbing management information related to the AV data, for example, such as a permitted number of times of dubbing depending on whether the storage medium is rewritable or not.

The display unit 15 is, for example, a display such as a CRT (Cathode Ray Tube) or a LCD (Liquid Crystal Monitor), and displays e.g., reproduction of AV data or an AV data list screen. The display unit 15 may display reproduced AV data or an AV data list screen on a display for data display such as a reproduction CRT or a LCD. In that case, the data recording apparatus 101 or the display unit 15 may be configured to include a display for data display separately, or a display for data display may be configured to be disposed separately other than the data recording apparatus 101.

The input unit 16 receives operation input information from a user. The input unit 16 is configured, for example, in a form such as operation keys or a remote controller provided to the data recording apparatus 101, and receives operation input information from a user.

The media recording unit 17 reads AV data recorded in storage medium and writes AV data to storage medium. Also, the media recording unit 17 further reads, for example, the information related to media such as a media identifier (hereinafter, referred to as media information) from storage medium, and notifies the information to the dubbing management information management unit 14. Here, the media identifier is assigned to individual storage medium and is capable of identifying individual storage medium uniquely.

In addition, the media recording unit 17 performs dubbing or move between the storage medium and the data recording units 13, or between the storage medium and another storage medium.

By using an example of disk medium such as a DVD-R, a DVD-RAM, a BD-R, a BD-RE (BD (Blu-ray Disc (registered trademark))) for storage medium, from or to which the media recording unit 17 reads or writes, description is given below; however, the storage medium are not limited to these. For example, the media recording unit 17 may read from a flash memory storage medium such as an SD card, or rewritable semiconductor memory.

The media determination unit 18 determines the media type of the destination storage medium storing the AV data, to which the media recording unit 17 performs dubbing or move, and notifies the determined media type to the dubbing management information management unit 14. Here, the media type shows the physical type of the storage medium which stores AV data (content), and corresponds to a HDD, a DVD-R, a DVD-RAM, a BD-R, a BD-RE, and the like. Therefore, it is possible to determine whether given storage medium is a rewritable storage medium, or a write-once read-many storage medium by the media type.

The media determination unit 18 may determine the media type of the destination storage medium storing the AV data, to which the data recording unit 13 performs dubbing or move, and based on the determination, may determine whether the storage medium is rewritable or non-rewritable. Alternatively, the media determination unit 18 may determine the media type of the storage medium to notify the determined media type to the dubbing management information management unit 14, which may determine whether the storage medium is rewritable or non-rewritable.

The data recording apparatus 101 is configured as described above. By this configuration, regardless of whether the storage medium is a rewritable storage medium or a non-rewritable write-once read-many storage medium, the information of the permitted number of times of dubbing of AV data supported for multiple times dubbing can be managed according to the type of the storage medium.

In the following, management of the information related to the permitted number of times of dubbing of AV data supported for multiple times dubbing in Embodiment 1 is described by showing an example.

Figure 2:
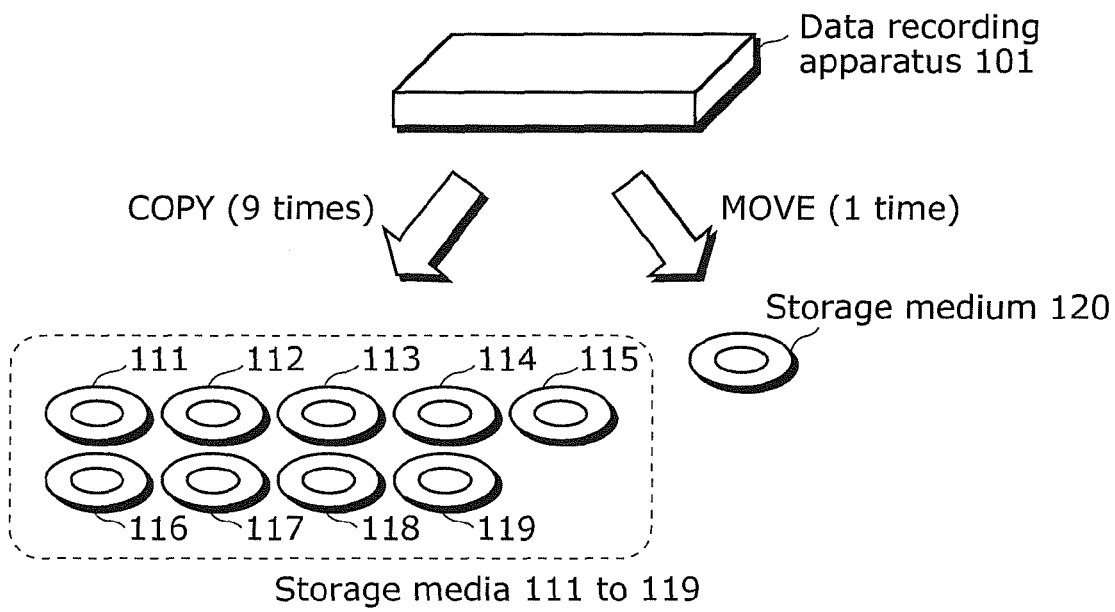
FIG. 2 is a diagram showing a general overview of how a data recording apparatus according to the embodiment of the present invention performs dubbing of AV data to storage medium in accordance with the operation regulation of the Dubbing 10 system.

First, an overview of the Dubbing 10 system in the digital terrestrial broadcast is described using FIG. 2. FIG. 2 is a diagram showing a general overview of how a data recording apparatus according to Embodiment 1 of the present invention performs dubbing of AV data to storage medium in accordance with the operation regulation of the Dubbing 10 system. FIG. 2 shows a general overview of how a data recording apparatus, which has recorded AV data supported by the Dubbing 10 system, and acquired from the digital terrestrial broadcast, according to Embodiment 1 of the present invention performs dubbing of the AV data to storage medium in accordance with the operation regulation of the Dubbing 10 system. Also, because the detailed information of the Dubbing 10 system is disclosed in the Ministry of Internal Affairs and Communications, and the Association for Promotion of Digital Broadcasting, description is omitted herein.

In FIG. 2, the data recording apparatus 101 has a built-in HDD, which is a recording medium, in the data recording unit 13 included in the data recording apparatus 101, the AV data obtained by receiving the digital terrestrial broadcast via the receiving unit 12 is recorded in the built-in HDD. According to the operation regulation of the Dubbing 10 system, creation of a copy of the AV data recorded in the data recording apparatus 101 is allowed up to 9 times (9 storage media 111 to 119 are created). In addition, after the creation of 9 copies, the AV data recorded in the HDD in the data recording apparatus 101 is allowed to be moved (only 1 time) to storage medium 120. That is to say, the Dubbing 10 system permits 9 copies corresponding to up to 9th dubbing, and one move corresponding to 10th dubbing in accordance with its regulation. Thereby, a maximum of 10 storage medium can be created by copying and recording thereon the AV data recorded in the HDD of the data recording apparatus 101 from the digital terrestrial broadcast.

As described above, move is AV data replication method, in which after a copy of AV data is created in storage medium, the original AV data which is recorded in the HDD in the data recording apparatus 101 is deleted.

The copy destination or move destination of the AV data recorded in the HDD of the data recording apparatus 101 from the digital terrestrial broadcast is not limited to the storage media represented by such disk media as shown in FIG. 2. For example, another data recording apparatus with built-in HDD or a portable device, which is connected to the data recording apparatus 101, for example, via a network may be used as a storage medium.

Also, each of storage media 111 to 120 shown in FIG. 2 is either a storage medium that can be rewritten (hereinafter, referred to as rewritable storage medium) or a storage medium that cannot be rewritten (hereinafter, referred to as a write-once read-many storage medium).

Figure 3:
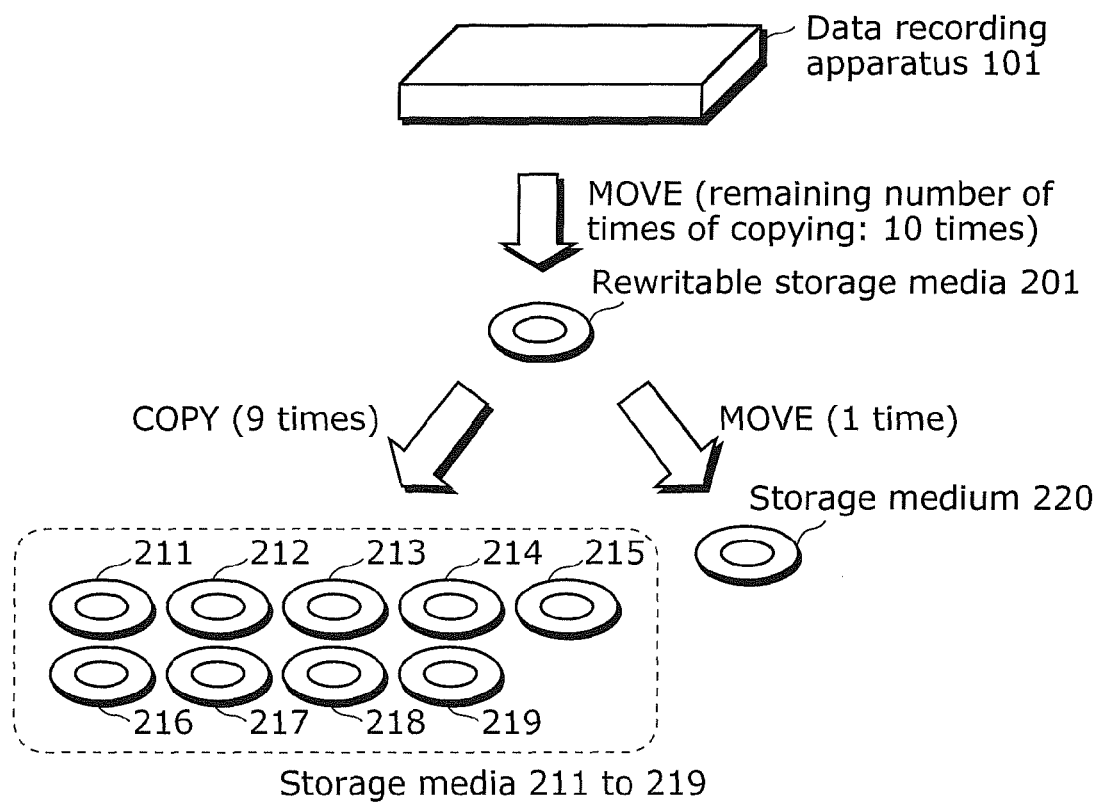
FIG. 3 is a diagram showing an overview of the operation in the case where AV data in a data recording apparatus according to the embodiment of the present invention is moved to rewritable storage medium.

Next, using FIG. 3, an overview of the operation in the case where the AV data supported by the Dubbing 10 system, which is once recorded in the data recording apparatus 101, is moved to rewritable storage medium 201 is described. FIG. 3 is a diagram showing an overview of the operation in the case where the AV data supported by the Dubbing 10 system, which is recorded in the data recording apparatus, is moved to the rewritable storage medium.

In FIG. 3, when the AV data supported by the Dubbing 10 system, which is recorded in the data recording apparatus 101, is moved to the rewritable storage medium 201, the remaining permitted number of times of dubbing is transferred. Thus, the permitted number of times of dubbing transferred from the data recording apparatus 101 to the rewritable storage medium 201 is 10 times.

Therefore, the rewritable storage medium 201, after the AV data is moved thereto, allows 9 copies to be created to another storage medium (creation of a copy to storage media 211 to 219). Also, the storage medium as the move destination from the data recording apparatus 101 is the rewritable storage medium 201 as shown in the example of FIG. 3, thus the AV data can be deleted from the rewritable storage medium 201, which allows the AV data to be moved therefrom to storage medium 220 (10th dubbing).

Figure 4:
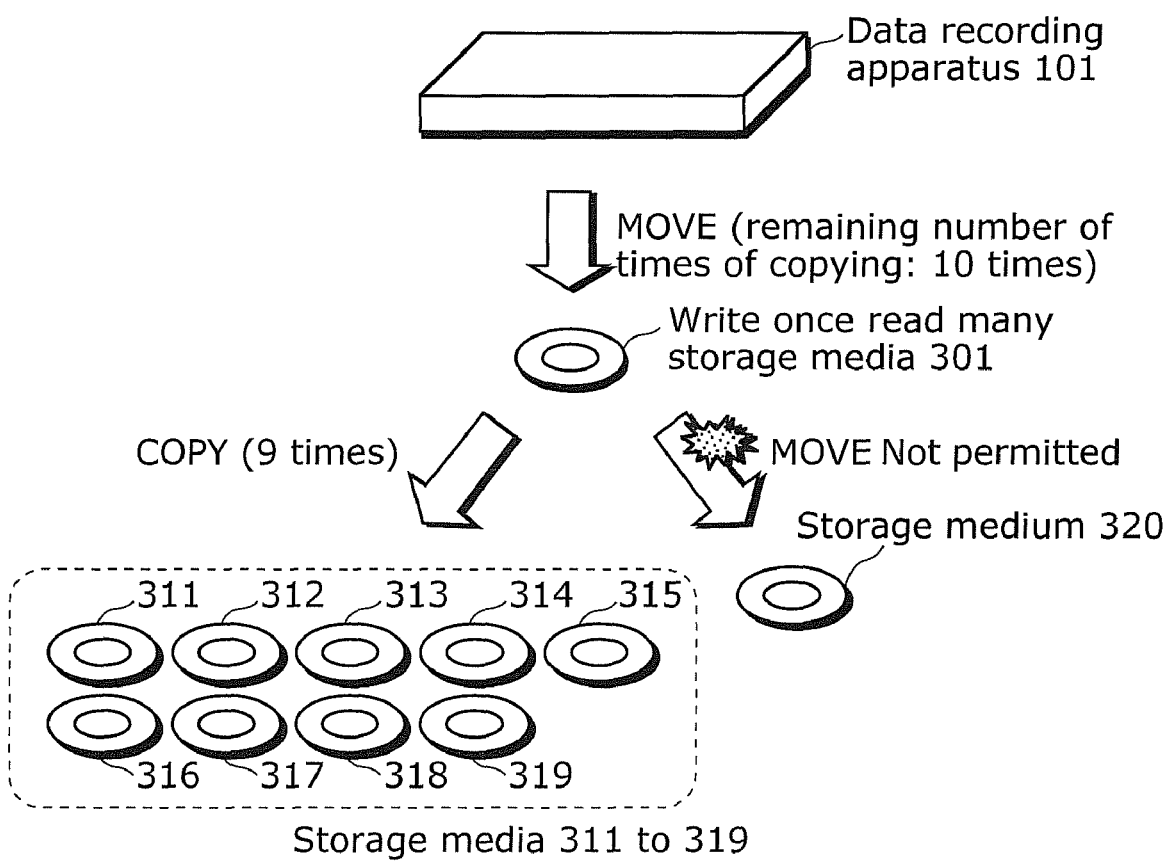
FIG. 4 is a diagram showing an overview of the operation in the case where AV data in a data recording apparatus according to the embodiment of the present invention is moved to a write-once read-many storage medium.

Next, using FIG. 4, an overview of the operation in the case where the AV data supported by the Dubbing 10 system, which is once recorded in the data recording apparatus 101, is moved to a non-rewritable write-once read-many storage medium 301 is described. FIG. 4 is a diagram showing an overview of the operation in the case where the AV data supported by the Dubbing 10 system, which is recorded in the data recording apparatus, is moved to the write-once read-many storage medium.

In FIG. 4, similarly to the example shown in FIG. 3, when the AV data supported by the Dubbing 10 system, which is recorded in the data recording apparatus 101, is moved to the write-once read-many storage medium 301, the permitted number of times of dubbing in the Dubbing 10 system is transferred. Thus, the permitted number of times of dubbing transferred from the data recording apparatus 101 to the write-once read-many storage medium 301 is 10 times.

Therefore, the write-once read-many storage medium 301, after the AV data is moved thereto, allows 9 copies to be created to another storage medium (creation of a copy to storage media 311 to 319). However, the storage medium as the move destination from the data recording apparatus 101 is the write-once read-many storage medium 301 as shown in the example of FIG. 4, thus the AV data cannot be deleted from the write-once read-many storage medium 301, which does not allow the AV data to be moved therefrom to storage medium 320 (10th copy).

As described above, when the AV data is moved from the data recording apparatus 101 to the rewritable storage medium 201 or the write-once read-many storage medium 301, move of the AV data, which corresponds to the 10th dubbing, can be made or cannot be made according to the media type.

Figure 5:
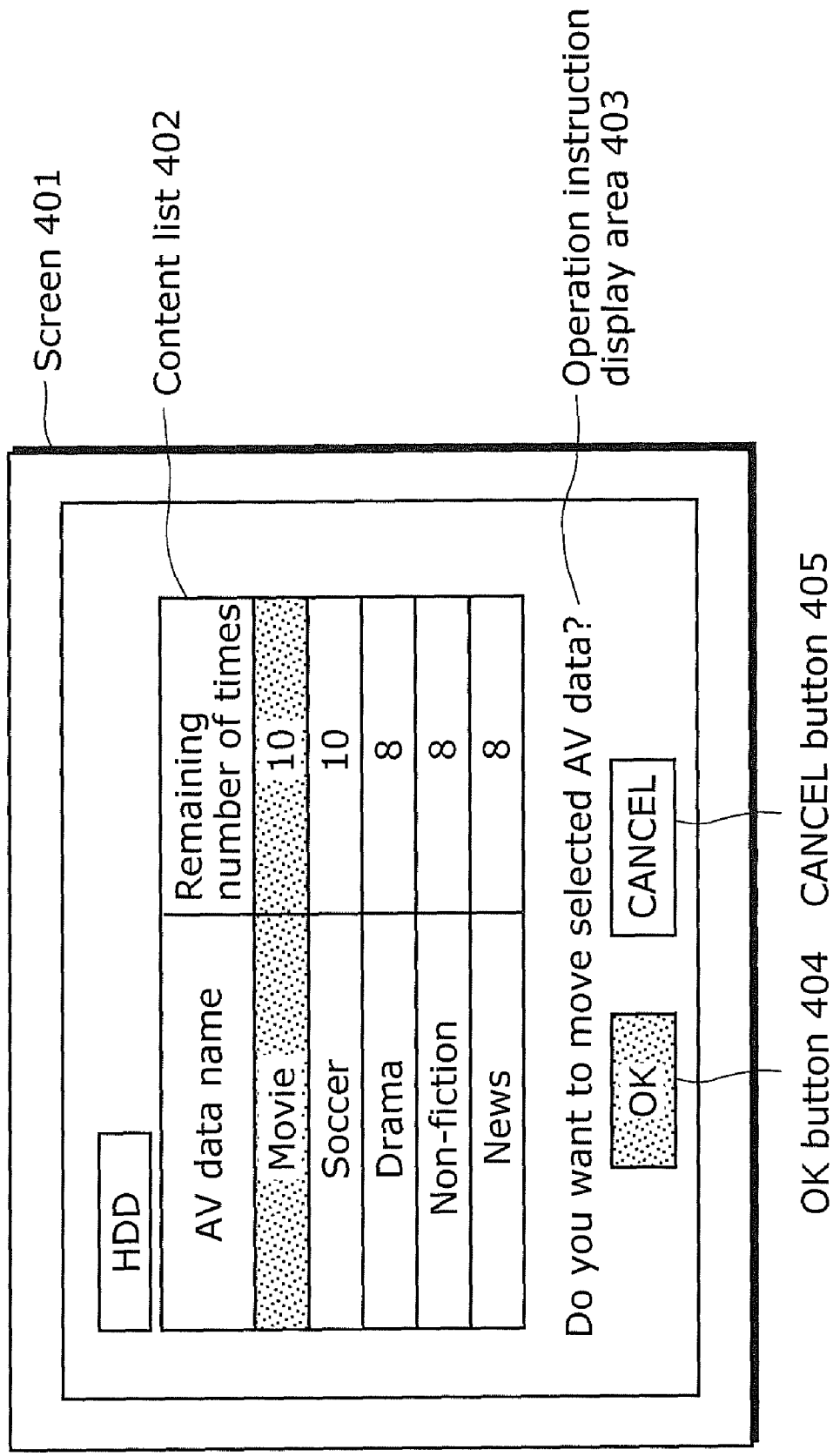
FIG. 5 is a diagram showing an example of an operation image when the AV data supported by the Dubbing 10 system, and stored in a HDD of a data recording apparatus according to the embodiment of the present invention is dubbed or moved to storage medium.

Next, management method for the information related to the permitted number of times of dubbing of the AV data in the data recording apparatus 101 is described. That is to say, referring to FIG. 5, a method for counting the number of times of dubbing in a rewritable storage medium and a write-once read-many storage medium is described in the case where dubbing of the AV data supported by the Dubbing 10 system is performed in the data recording apparatus 101. FIG. 5 is a diagram showing an example of an operation image when the AV data supported by the Dubbing 10 system, and stored in a HDD of a data recording apparatus according to the embodiment of the present invention is dubbed or moved to a storage medium.

In FIG. 5, a user selects AV data to be dubbed (copied) or moved from a AV data list 402 showing the content list displayed on a screen 401 of the display unit 15 (not shown) included in the data recording apparatus 101. In the example shown in FIG. 5, totally 5 AV data of "movie", "soccer", "drama", "non-fiction", and "news" are recorded in the HDD of the data recording apparatus 101. The remaining number of times displayed on the AV data list 402 indicates the remaining permitted number of times of dubbing of each AV data, and the value thereof is decremented each time the AV data is dubbed to a storage medium or another data recording apparatus.

Also, the example shown in FIG. 5 shows that no dubbing has been performed for "movie" and "soccer", thus the remaining number of times, i.e., the value of the remaining number of times of dubbing is 10; and dubbing has been performed 2 times for "drama", "non-fiction", and "news", thus the value of the remaining number of times of dubbing is 8.

Note that "HDD" displayed on the upper left of the screen 401 indicates the storage medium in which the AV data displayed on the AV data list 402 are recorded.

Also, an operation instruction display area 403 displays a message to a user. In the example shown in FIG. 5, the message for asking whether the user wants to move the AV data named "movie" currently selected and shown in halftone on the AV data list 402. In m the case where the user moves the AV data named "movie" currently selected, the user selects an OK button 404; otherwise, the user selects a CANCEL button 405.

Next, a method for counting the permitted number of times of dubbing of the AV data shown in the AV data list 402 of FIG. 5 in another storage medium after the AV data is copied or moved from the HDD of the data recording apparatus 101 to the another storage medium is described by using FIGS. 6 to 9.

Figure 6:
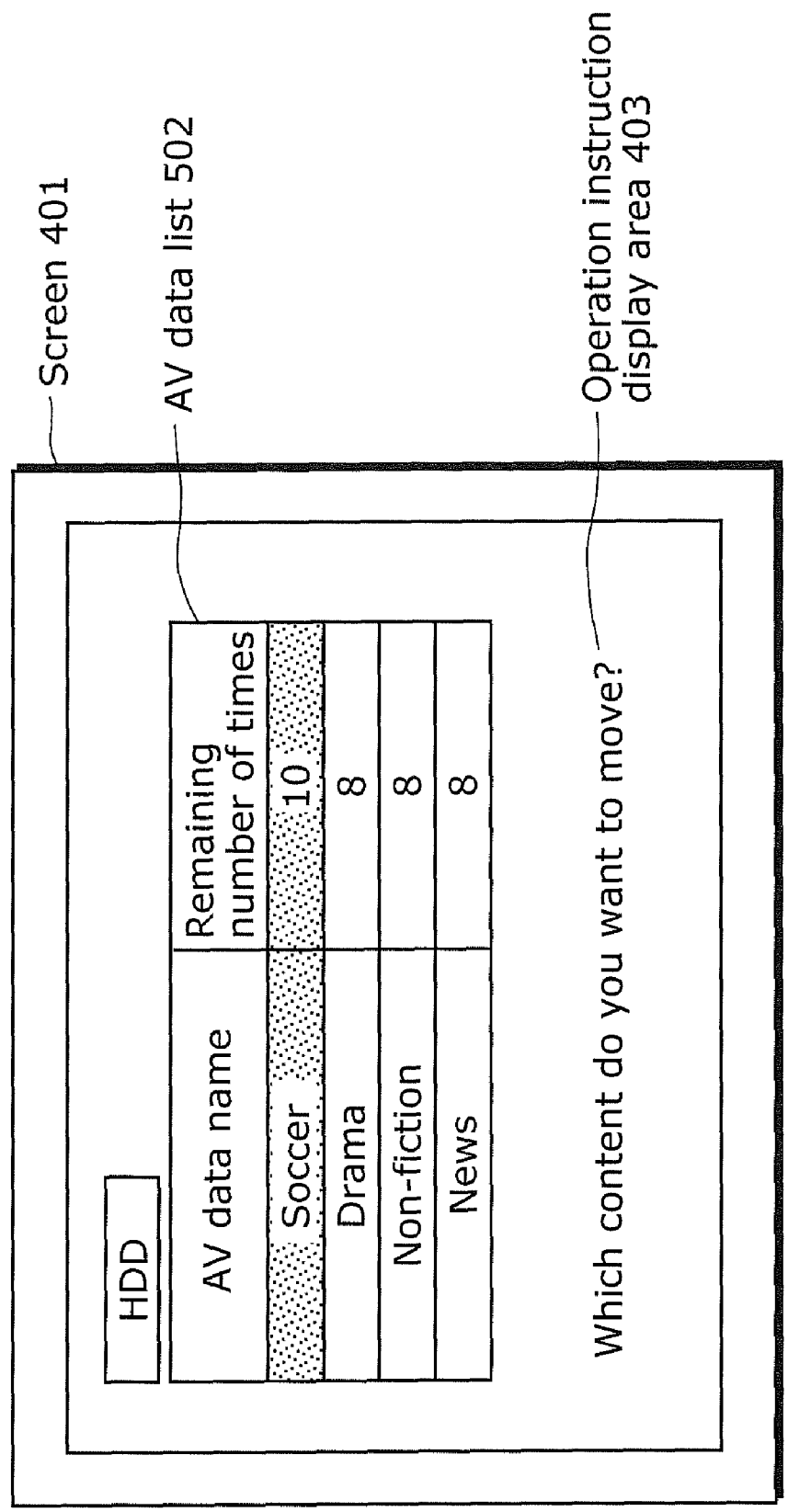
FIG. 6 is a diagram displaying the content of the AV data stored in a HDD in a data recording apparatus after the AV data named "movie" is moved to a DVD-RAM, which is rewritable storage medium, from the HDD in the data recording apparatus according to the embodiment of the present invention.

First, FIG. 6 displays the contents of the AV data stored in the HDD in the data recording apparatus 101 (AV data list 502) on the screen 401 after the AV data with the name "movie" is moved from the HDD in the data recording apparatus 101 to a DVD-RAM which is a rewritable storage medium. In FIG. 6, because the AV data with the name "movie", after being moved to the DVD-RAM, is deleted from the HDD in the data recording apparatus 101, the AV data is not displayed on the AV data list 502.

Figure 7:
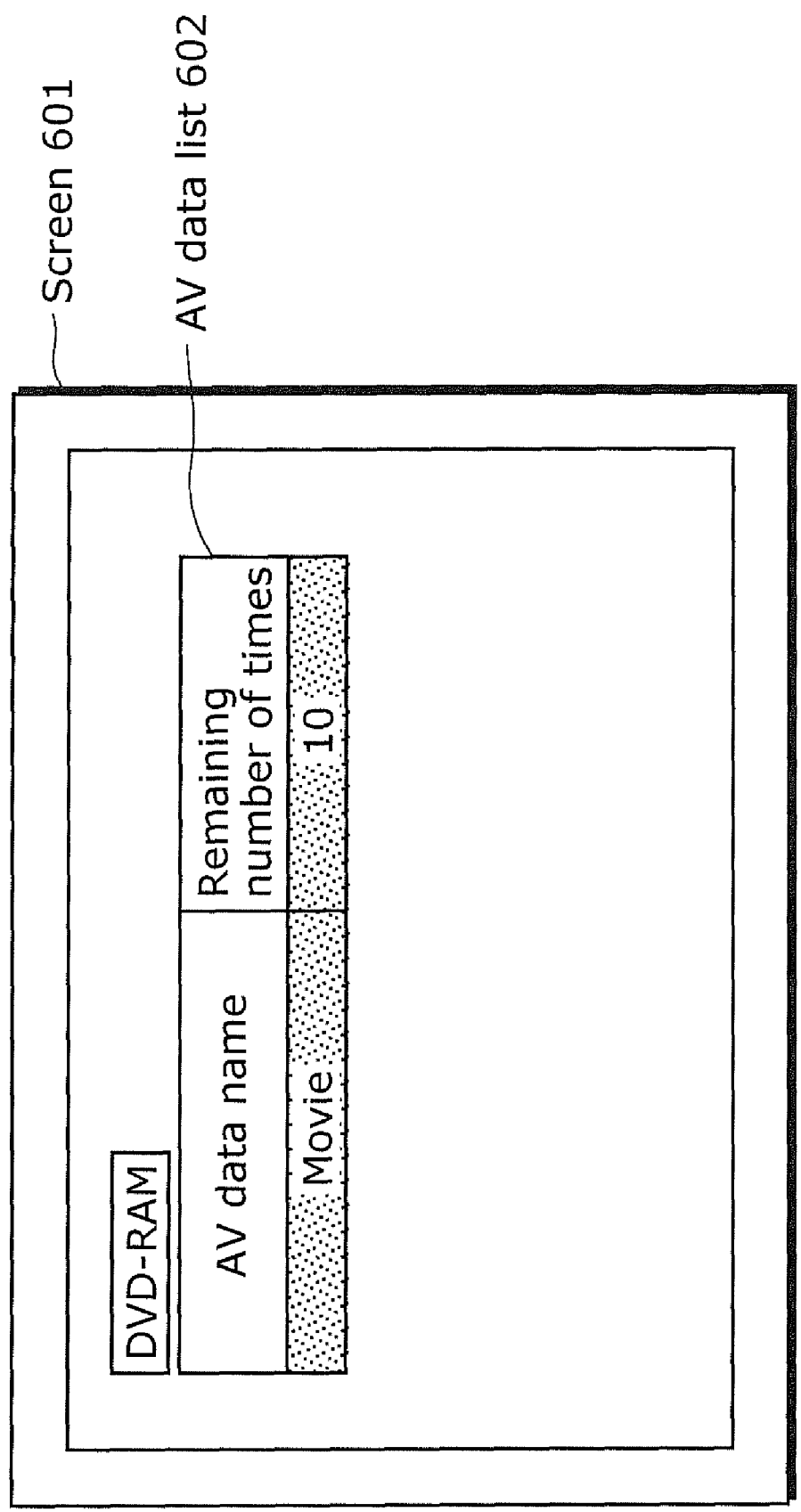
FIG. 7 is a diagram displaying the content of the AV data of a DVD-RAM after the AV data named "movie" is moved to the DVD-RAM from a HDD in a data recording apparatus according to the embodiment of the present invention.

FIG. 7 displays the contents of the AV data list of the DVD-RAM after the AV data with the name "movie" is moved from the HDD in the data recording apparatus 101 to the DVD-RAM. AV data list 602 on screen 601 displays the AV data of the "movie" which has been moved from the HDD. Because the remaining number of times (the remaining number of times of dubbing) of the AV data of "movie" is displayed as 10 on the AV data list 402 (see FIG. 5) of the HDD in the data recording apparatus 101, the remaining number of times is similarly displayed as 10 on the AV data list 602 of the DVD-RAM of the move destination. Note that "DVD-RAM" displayed on the upper left of the screen 601 indicates the storage medium in which the AV data displayed on the AV data list 602 are recorded.

Figure 8:
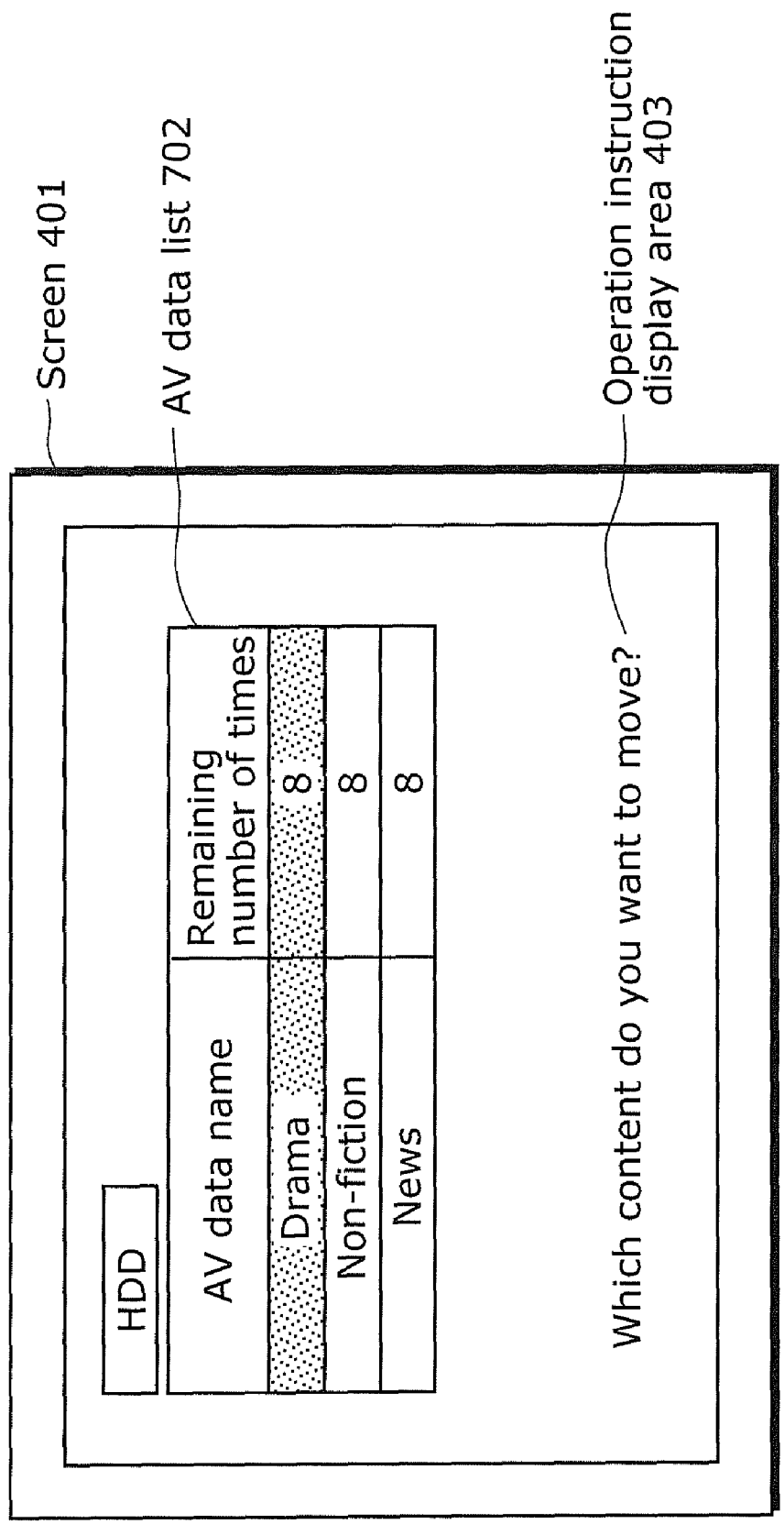
FIG. 8 is a diagram displaying the content of the AV data of a HDD in a data recording apparatus according to the embodiment of the present invention after the AV data named "soccer" is moved to a DVD-R, which is a write-once read-many storage medium.

FIG. 8 displays the contents of the AV data list of the HDD after the AV data with the name "soccer" is moved to a DVD-R, which is a write-once read-many medium. Because the AV data of "soccer", after being moved to the DVD-R, is deleted from the HDD in the data recording apparatus 101, the AV data is not displayed on AV data list 702.

Figure 9:
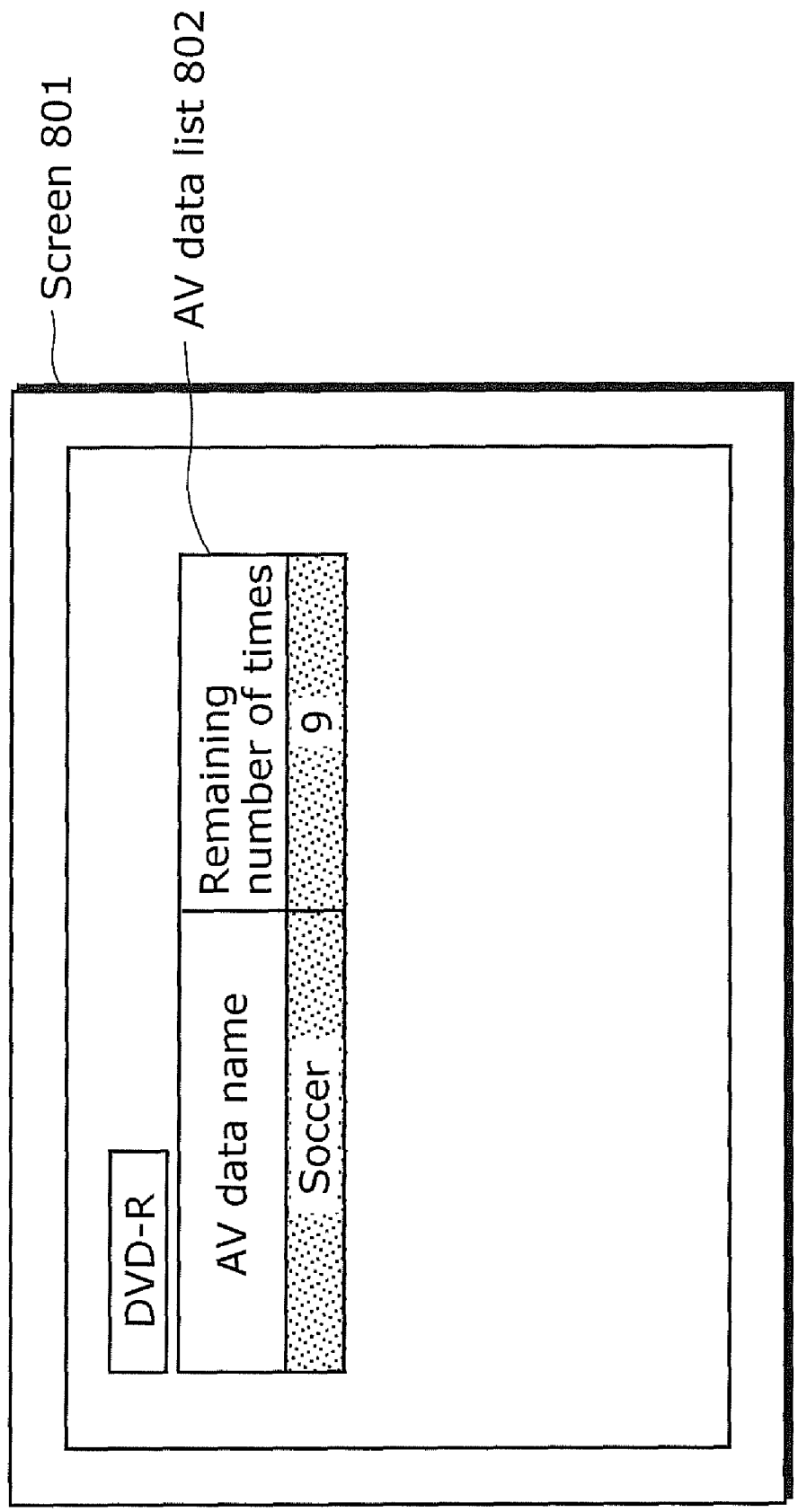
FIG. 9 is a diagram displaying the content of the AV data of a DVD-R after the AV data named "soccer" is moved to the DVD-R from a HDD in a data recording apparatus according to the embodiment of the present invention.

FIG. 9 displays the contents of the AV data list of the DVD-R after the AV data with the name "soccer" is moved from the HDD in the data recording apparatus 101 to the DVD-R. AV data list 802 on screen 801 displays the AV data of the "soccer" which has been moved from the HDD. Note that "DVD-R" displayed on the upper left of the screen 801 indicates the storage medium in which the AV data displayed on the AV data list 802 are recorded.

Here, even though the remaining number of times of dubbing of the AV data with the name "soccer" is displayed as 10 on the AV data list 402 (see FIG. 5) of the HDD in the data recording apparatus 101, the remaining number of times of dubbing of the AV data with the name "soccer" is displayed as 9 on the AV data list 802 of the DVD-R of the move destination. This is because the DVD-R is a non-rewritable storage medium, thus the move which requires deletion of AV data cannot be performed so that the value decremented by 1 for the move corresponding to the 10th dubbing is displayed.

In contrast, a conventional data recording apparatus does not determine that a storage medium is non-rewritable even though the storage medium is a DVD-R, thus the move which requires deletion of AV data cannot be performed. That is to say, in a conventional data recording apparatus, the remaining number of times of copying of AV data may be incorrectly displayed as 10 even though the AV data can be copied only 9 times. In contrast to this, the data recording apparatus 101 according to Embodiment 1 determines whether a storage medium is rewritable or non-rewritable by the media determination unit 18, and accordingly the dubbing management information management unit 14 manages the remaining permitted number of times of dubbing. The remaining permitted number of times of dubbing is then displayed by the display unit 15 according to the storage medium type difference. Thereby, a user can precisely recognize the remaining permitted number of times of dubbing, i.e., the remaining number of times of copying without paying attention to the difference in type of the storage medium.

Next, the dubbing management information that is the management information related to the permitted number of times of dubbing held by the data recording apparatus 101, i.e., the management information of the remaining number of times managed by the dubbing management information management unit 14 (the remaining number of times of dubbing) is described. In Embodiment 1, the management information of the remaining number of times after AV data is copied or moved to a storage medium is also managed in the data recording apparatus 101. Thereby, it is not necessary to record the dubbing management information in a write-once read-many storage medium, or a rewritable storage medium in which the management information of the remaining number of times cannot be written. Thus management of the permitted number of times of dubbing for the storage medium of both copy destinations and move destinations is possible.

FIGS. 10A and 10B are tables conceptually showing the dubbing management information managed by the data recording apparatus according to Embodiment 1.

Similarly to the screen 401 of FIG. 4, FIG. 10A is a table showing the dubbing management information managed by the data recording apparatus 101 in a state where 5 AV data with the names of "movie", "soccer", "drama", "non-fiction", and "news" are recorded in the HDD in the data recording apparatus 101.

In FIG. 10A, because all the AV data are recorded in the HDD, a media identifier (HDD-0001) capable of identifying the HDD is assigned to the HDD.

Here, the media identifiers shown in FIGS. 10A and 10B are assigned to individual storage medium, and are capable of identifying individual storage medium uniquely. Regarding the media identifier, as long as the identifier is capable of uniquely identifying storage medium in which AV data is recorded, the format of the identifier is not particularly limited.

The media types shown in FIGS. 10A and 10B indicate physical types of the storage media which store AV data (content), and correspond to, for example, HDD, DVD-R, DVD-RAM, BD-R, BD-RE, and the like. With these media types, the media determination unit 18 can determine whether a storage medium is a rewritable storage medium, or a write-once read-many storage medium.

The AV data name is an identifier assigned to individual AV data, and corresponds to, for example, a program name of the digital terrestrial broadcast such as "movie", "soccer", "drama", "non-fiction", or "news."

The remaining number of times shows the remaining permitted number of times of dubbing of each AV data (the remaining number of times of dubbing), and the value of the remaining number of times is decremented by 1 each time dubbing of the AV data is performed.

FIG. 10B is a table showing the dubbing management information managed by the data recording apparatus 101 in the above-described states as shown in FIGS. 7 to 9 after the AV data with the name of "movie", and the AV data with the name of "soccer" are moved to a DVD-RAM and a DVD-R, respectively in the state of the dubbing management in FIG. 10A.

In FIG. 10B, the media identifier of the AV data of the "movie" which has been moved to the DVD-RAM is updated to "DVD-RAM-0001", i.e., the media identifier which has been assigned to the DVD-RAM, and the media type is updated to "DVD-RAM." Also, the media identifier of the AV data of the "soccer" which has been moved to the DVD-R is updated to "DVD-R-0001", i.e., the media identifier which has been assigned to the DVD-R, and the media type is updated to "DVD-R."

Here, because the DVD-R is a non-rewritable storage medium, the remaining number of times for the data with the name of "soccer" is 1 less than the one in FIG. 10A.

In this manner, in the data recording apparatus 101 according to Embodiment 1, the media determination unit 18 determines the media type, and based on the determined media type, determines whether the storage medium is non-rewritable or rewritable. According to the determination result, the dubbing management information management unit 14 manages the remaining permitted number of times of dubbing after moving or dubbing AV data as dubbing management information. As shown in FIGS. 6 to 8, the display unit 15 displays the remaining permitted number of times of dubbing, which reflects the media type difference based on the dubbing management information. Thereby, a user can precisely recognize the remaining permitted number of times of dubbing, i.e., the remaining number of times of dubbing without paying attention to the difference in type of the storage medium.

In a conventional data recording apparatus, the remaining permitted number of times of dubbing after moving or dubbing AV data in the consideration of whether the storage medium is non-rewritable or rewritable cannot be managed. For this reason, in a conventional data recording apparatus, even though the move for 10th dubbing subsequent to 9th copying corresponding to 9th dubbing is possible, the remaining number of times of dubbing for the AV data is displayed as 9, for example, for the storage medium in which move of AV data that requires deletion of the AV data can be performed. Thus it was difficult for a user to precisely recognize the remaining number of times of dubbing.

Next, the operation of the data recording apparatus 101 is described using FIGS. 11 to 18.

First, FIG. 11 is a flowchart showing the recording operation of the digital broadcast by a data recording apparatus in Embodiment 1.

In FIG. 11, when an instruction of recording a digital broadcast is first given by a user, the data recording apparatus 101 starts a recording operation (S1101). The receiving unit 12 tunes in the channel of the digital broadcast selected by the user for recording, and receives the AV data of the tuned channel, while extracting the information indicating whether the AV data is supported by the Dubbing 10 system, the information being included in the SI/PSI information of the AV data in the tuned channel (S1102).

Next, the data recording unit 13 records the AV data of the channel tuned by the receiving unit 12 (S1103). The compression format of the audio/visual data (AV data) recorded in the data recording unit 13 is not related to the gist of the present invention, thus is not mentioned herein.

Next, the dubbing management information management unit generates dubbing management information including the permitted number of times of dubbing, for example, as shown in FIG. 9(a) based on the information indicating whether the AV data extracted by the receiving unit 12 is supported by the Dubbing 10 system or not (S1104). Specifically, in the case where the information extracted by the receiving unit 12 shows that the AV data is supported by the Dubbing 10 system, the dubbing management information management unit 14 sets the value of the remaining number of times indicating the remaining permitted number of times of dubbing, to 10, and terminates the recording operation of the digital broadcast (S1105). Further, in the case where the information extracted by the receiving unit 12 indicates that the AV data is not supported by the Dubbing 10 system, the dubbing management information management unit 14 sets the value of the remaining number of times to 0, and terminates the recording operation of the digital broadcast (S1105).

In the above manner, the data recording apparatus 101 performs the recording operation of the digital broadcast.

In the above, the AV data supported by the Dubbing 10 system is used as an example for AV data supported for multiple times dubbing. For this reason, the dubbing management information management unit 14 sets the value of the remaining number of times of dubbing to a fixed number 10; however, the value is not limited to 10. For example, in the case where the permitted number of times of dubbing, i.e., the remaining number of times (the remaining number of times of dubbing) is set as the information assigned to the AV data received from the channel in which the receiving unit 12 has tuned, the dubbing management information management unit 14 may set the above-mentioned permitted number of times of dubbing as the dubbing management information.

Figure 12:
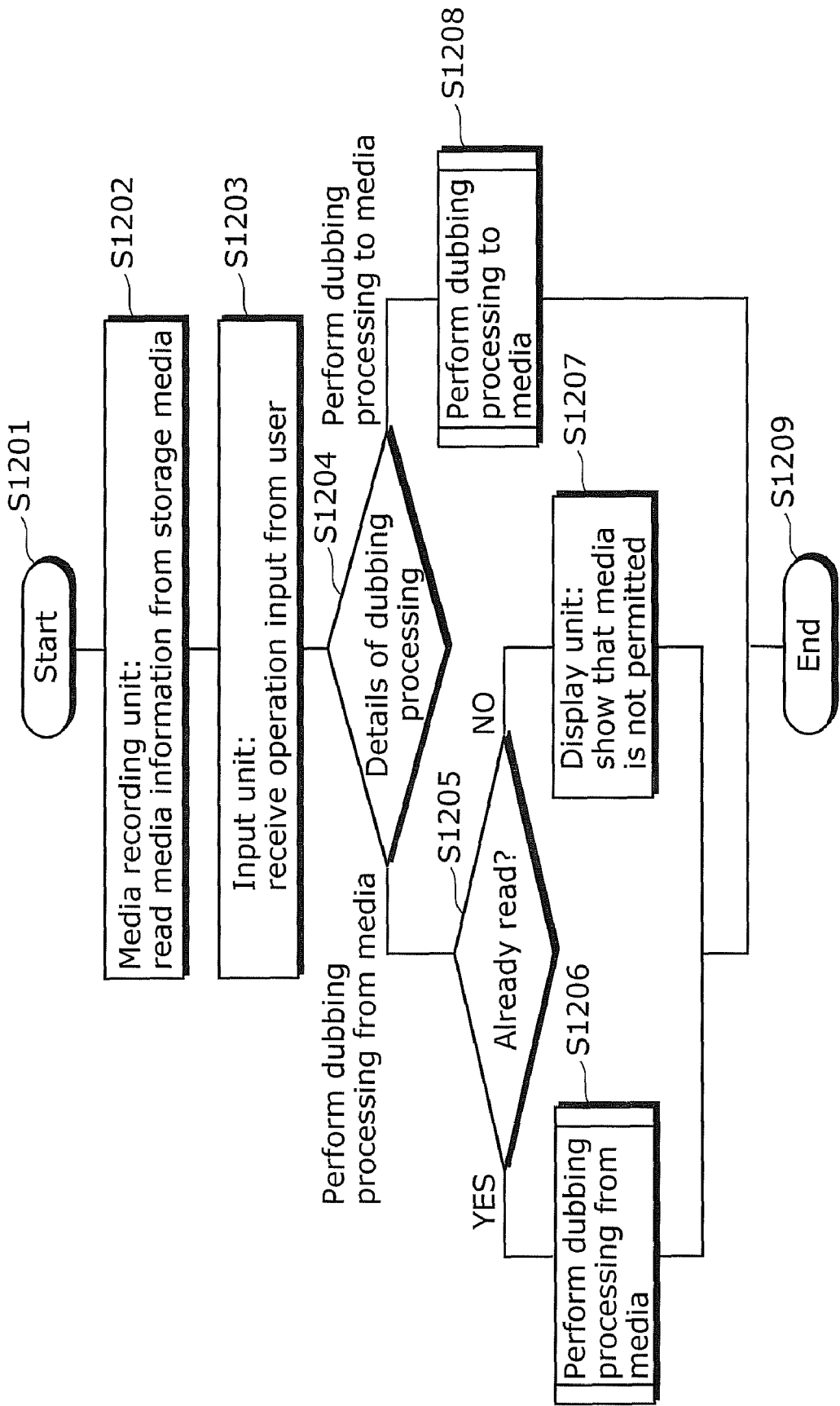
FIG. 12 is a flowchart showing the operation in the case where a data recording apparatus according to the embodiment of the present invention performs dubbing of the AV data recorded in a data recording unit bidirectionally between the data recording apparatus and storage medium.

Next, the operation in the case where the AV data (content) of a digital broadcast recorded in the data recording unit 13 of the data recording apparatus 101 is dubbed bidirectionally between the data recording apparatus 101 and a storage medium is described using FIG. 12. FIG. 12 is a flowchart showing the operation in the case where the data recording apparatus according to Embodiment 1 performs dubbing of the AV data of a digital broadcast recorded in the data recording unit bidirectionally between the data recording apparatus and the storage medium.

In FIG. 12, when an instruction of dubbing the recorded AV data of a digital broadcast is first given by a user, the data recording apparatus 101 starts dubbing operation (S1201). The media recording unit 17 reads the AV data name and the media identifier which are recorded in the storage medium, and notifies the read AV data name and the media identifier to the dubbing management information management unit 14 (S1202).

Next, the input unit 16, when receiving operation input information from the user (S1203), determines whether the details of the dubbing processing is either "dubbing processing to the storage medium" or "dubbing processing from the storage medium" based on the operation input information received from the user (S1204).

In the case where the detail of the dubbing processing is determined to be "dubbing processing to the storage medium" by the input unit 16 in S1204, the media recording unit 17 performs "dubbing processing to the storage medium" (S1208), and terminates the processing (S1209).

On the other hand, in the case where the detail of the dubbing processing is determined to be "dubbing processing from the storage medium" by the input unit 16 in S1204, the dubbing management information management unit 14 checks the AV data name and the media identifier notified from the media recording unit 17 with the AV data name and the media identifier held in the dubbing management information. The dubbing management information management unit 14 then determines whether the source storage medium of the dubbing processing has been read in the past or not (S1205).

In the case where it is determined that the source storage medium of the dubbing processing has been read in the past by the dubbing management information management unit 14 (in the case of YES in S1205) in S1205, the media recording unit 17 performs "dubbing processing from the storage medium" (S1206), and terminates the processing (S1209).

On the other hand, in the case where it is determined that the source storage medium of the dubbing processing has not been read in the past by the dubbing management information management unit 14 (in the case of NO in S1205) in S1205, the display unit 15 displays a message showing "dubbing processing from the storage medium is not permitted" to the user (S1207), and terminates the processing (S1209). This is because in the case where the storage medium has not been read in the past, the dubbing management information management unit 14 has not generated dubbing management information even once in the past for the AV data stored in the storage medium which has not been read, thus cannot manage the permitted number of times of dubbing for the AV data.

In the above manner, the data recording apparatus 101 performs dubbing processing of the AV data recorded in the media recording unit 17 bidirectionally between the data recording apparatus 101 and the storage medium.

Figure 13:
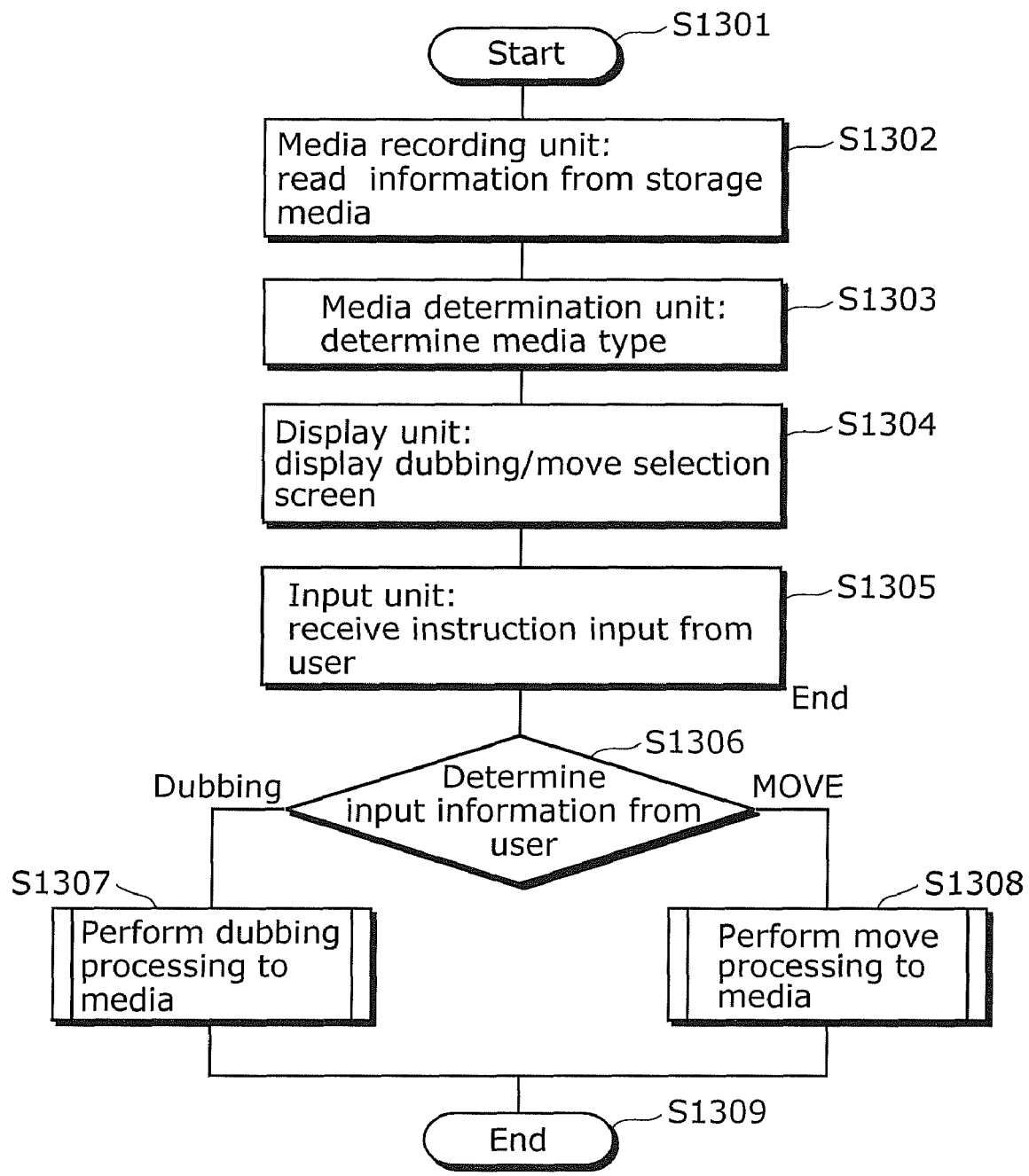
FIG. 13 is a flowchart showing the flow of dubbing or move processing to storage medium in the embodiment of the present invention.

Next, the dubbing or move processing in the case where the AV data of digital broadcast content recorded in the data recording unit 13 of the data recording apparatus 101 is dubbed or moved to a storage medium is described using FIG. 13. FIG. 13 is a flowchart showing the flow of the dubbing processing or move processing to the storage medium in Embodiment 1.

In FIG. 13, a user first instructs the data recording apparatus 101 to dub or move the AV data of digital broadcast content recorded in the data recording unit 13 to a storage medium. Then, the data recording apparatus 101 starts dubbing processing or move processing (S1301), the media recording unit 17 reads information related to media such as a media identifier from the storage medium, and notifies the read information to the media determination unit 18 (S1302).

Next, the media determination unit 18 determines the media type of the storage medium based on the information notified from the media recording unit 17, and notifies the determined media type to the dubbing management information management unit 14 (S1303).

Next, the display unit 15 displays a screen (dubbing screen) to prompt the user to decide on "move processing to a storage medium, or dubbing processing to a storage medium" (S1304). The move processing to the storage medium herein indicates the processing with a remaining permitted number of times of dubbing. i.e., with the value of the remaining number of times of dubbing being 1 or greater.

Next, in S1304, the input unit 16, when receiving the operation input information corresponding to the processing shown on the screen decided by the user (S1305), determines whether the operation input information from the user is either "dubbing processing to a storage medium", or "move processing to a storage medium" (S1306).

In the case where the operation input information from the user is determined to be "dubbing processing to a storage medium" in S1306, "dubbing processing to a storage medium" is performed (S1307), and in the case where the operation input information from the user is determined to be "move processing to a storage medium", "move processing to a storage medium" is performed (S1308). Then subsequently, the dubbing processing or move processing is terminated (S1309).

Figure 14:
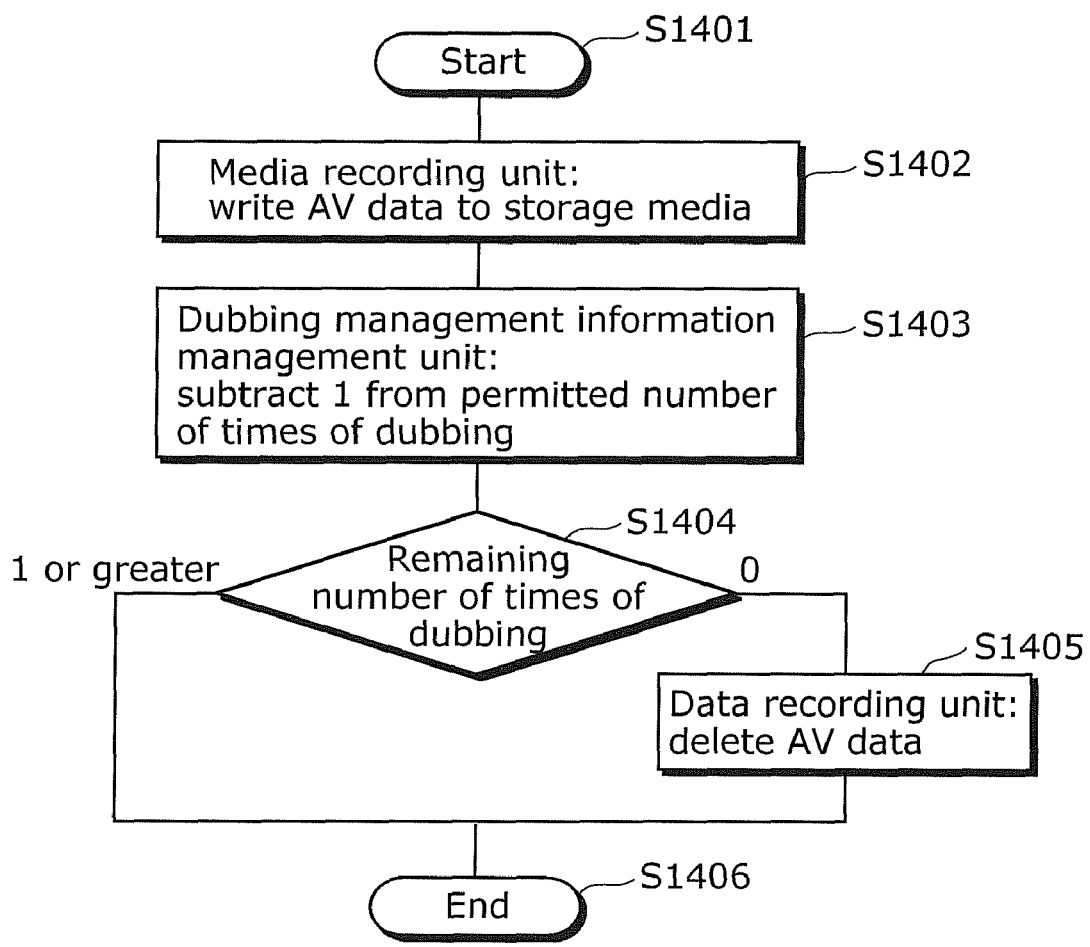
FIG. 14 is a flowchart showing the flow of dubbing processing to storage medium in the embodiment of the present invention.

Next, "dubbing processing to a storage medium" in S1307 in FIG. 13, i.e., the dubbing processing in the case where the AV data of digital broadcast content recorded in the data recording apparatus 101 is dubbed to the storage medium is described using FIG. 14. FIG. 14 is a flowchart showing the flow of the dubbing processing to the storage medium in Embodiment 1.

In FIG. 14, a user first instructs the data recording apparatus 101 to dub the AV data of digital broadcast content recorded in the data recording unit 13 to the storage medium. Then, the data recording apparatus 101 starts dubbing processing (S1401), and the media recording unit 17 writes the AV data recorded in the data recording unit 13 to the storage medium (1402).

Next, when the media recording unit 17 completes the writing of the AV data to the storage medium, the dubbing management information management unit 14 subtracts 1 from the value of the permitted number of times of dubbing of the AV data (S1403).

Then after subtracting 1 from the value of the permitted number of times of dubbing of the AV data, the dubbing management information management unit 14 checks whether the value of the remaining permitted number of times of dubbing, i.e., the remaining number of times (the remaining number of times of dubbing) is 0 (zero), or 1 or greater (S1404), and when the remaining number of times is 1 or greater, the dubbing processing is terminated. (S1406). On the other hand, when the dubbing management information management unit 14 confirms that the remaining number of times is 0, the data recording unit 13 deletes the AV data for which the remaining number of times has become 0 (S1405), and terminates the dubbing processing (S1406).

In the above manner, the data recording apparatus 101 performs dubbing processing to the storage medium.

Figure 15:
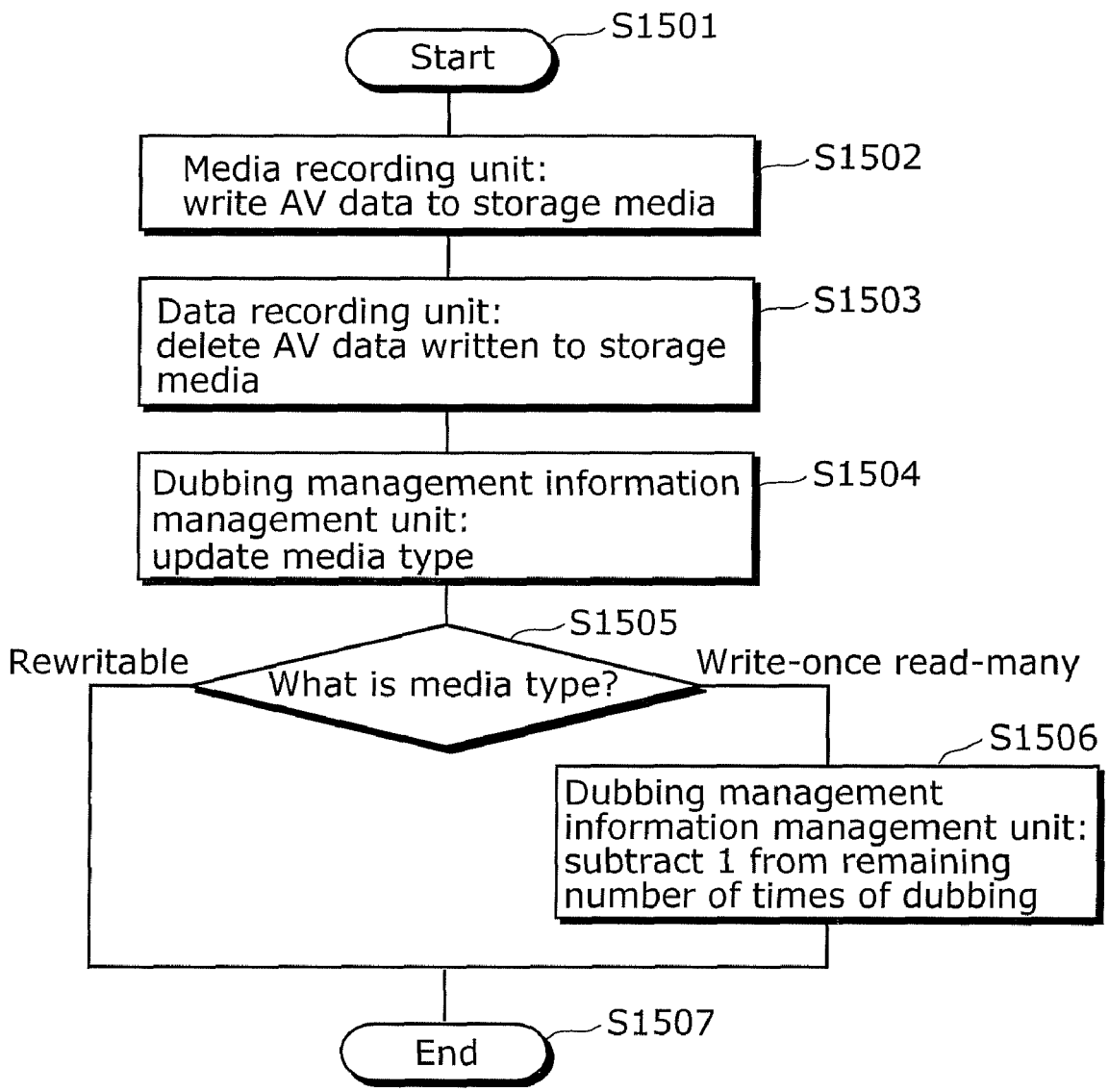
FIG. 15 is a flowchart showing the flow of move processing to storage medium in the embodiment of the present invention.

Next, "move processing to a storage medium" of S1308 in FIG. 13, i.e., the move processing in the case where the AV data of digital broadcast content recorded in the data recording apparatus 101 is moved to a storage medium is described using FIG. 15. FIG. 15 is a flowchart showing the flow of the move processing to the storage medium in Embodiment 1.

In FIG. 15, a user first instructs the data recording apparatus 101 to move the AV data of digital broadcast content recorded in the data recording unit 13 to the storage medium.

Then, the data recording apparatus 101 starts move processing (S1501), and the media recording unit 17 writes the AV data recorded in the data recording unit 13 to the storage medium (1502).

Next, when the media recording unit 17 completes the writing of the AV data to the storage medium, the data recording unit 13 deletes the AV data written to the storage medium (S1503). The dubbing management information management unit 14 then updates the media type of the dubbing management information corresponding to the AV data written to the storage medium to the media type of the storage medium to which the AV data is written (S1504).

In S1504, the media determination unit 18 determines whether the storage medium is a rewritable storage medium or a non-rewritable write-once read-many storage medium based on the updated media type (S1505).

In the case where the storage medium is determined to be a rewritable storage medium based on the updated media type, the media recording unit 17 terminates the move processing (S1507). On the other hand, in the case where the storage medium is determined to be a write-once read-many storage medium based on the updated media type, the dubbing management information management unit 14 subtracts 1 from the value of the remaining permitted number of times of dubbing in the dubbing management information corresponding to the AV data, i.e., the remaining number of times (the remaining number of times of dubbing) (S1506), and subsequently, terminates the move processing by the media recording unit 17 (S1507).

In the above manner, the data recording apparatus 101 performs move processing to the storage medium.

Figure 16:
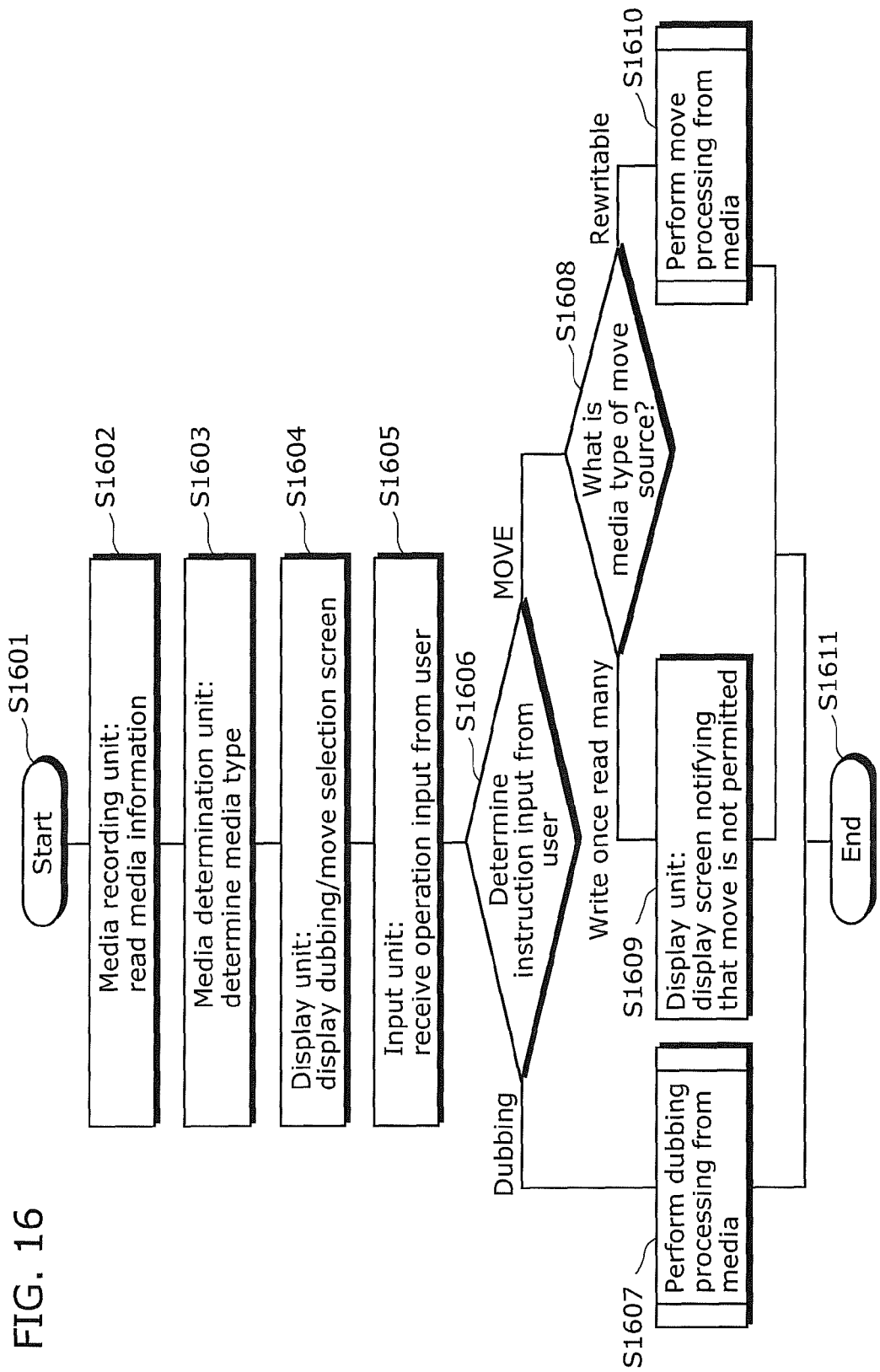
FIG. 16 is a flowchart showing the flow of dubbing or move processing to a data recording unit from storage medium in the embodiment of the present invention.

Next, the dubbing processing or the move processing from a storage medium to the data recording unit 13 is described using FIG. 16. FIG. 16 is a flowchart showing the flow of the dubbing processing or the move processing from the storage medium to the data recording unit in Embodiment 1.

In FIG. 16, when a user first instructs the data recording apparatus 101 to dub or move the AV data recorded in the storage medium, the data recording apparatus 101 starts the dubbing processing or the move processing (S1601). The media recording unit 17 reads media information from the storage medium, and notifies the read media information to the media determination unit 18 (S1602).

Next, the media determination unit 18 determines the media type of the storage medium based on the media information notified from the media recording unit 17, and notifies the determined media type to the dubbing management information management unit 14 (S1603).

Next, the display unit 15 displays a screen to prompt the user to decide between "dubbing processing from a storage medium, or move processing from a storage medium" (S1604). The move processing from a storage medium herein does not indicate the move processing as the 10th dubbing in the Dubbing 10 system, but indicates the processing with a remaining permitted number of times of dubbing. i.e., with the value of the remaining number of times of dubbing being 1 or greater.

Next, the input unit 16 receives the processing on the screen which is displayed on the display unit 15 and determined by the user, i.e., the user's instruction input information in response to the screen display prompting the user to decide between "dubbing processing or move processing" (S1605). The input unit 16 then determines whether the received instruction input information from the user is "dubbing processing from a storage medium" or "move processing from a storage medium" (S1606).

In the case where the instruction input information from the user is determined to be "dubbing processing from a storage medium" in S1606, the dubbing processing from the storage medium is performed (S1607), and subsequently the processing is terminated (S1611). On the other hand, in the case where the instruction input information from the user is determined to be "move processing from a storage medium" in S1606, the media determination unit 18 determines whether the storage medium of the move source is a non-rewritable write-once read-many storage medium or a rewritable media (S1608).

In the case where the storage medium of the move source is determined to be a write-once read-many storage medium in S1608, the AV data recorded in the storage medium of the move source cannot be deleted. Thus, the display unit 15 displays a screen message informing that the move cannot be performed (S1609), and the processing is terminated (S1611).

On the other hand, in the case where the storage medium of the move source is determined to be a rewritable storage medium in S1608, the move processing from the storage medium is performed (S1610), and subsequently the processing is terminated (S1611).

In the above manner, the data recording apparatus 101 performs the dubbing processing or the move processing from the storage medium to the media recording unit 17.

Next, the dubbing processing from a certain storage medium to another storage medium is described using FIG. 17. FIG. 17 is a flowchart showing the flow of the dubbing processing from the certain storage medium to another storage medium in Embodiment 1.

In FIG. 17, when a user first instructs the data recording apparatus 101 to dub the AV data recorded in the certain storage medium, the data recording apparatus 101 starts the dubbing processing (S1701).

Next, the media recording unit 17 copies the AV data from the certain storage medium which holds the AV data as the dubbing source to another storage medium which is newly inserted into the media recording unit 17 (S1702). As a copy creation method, there is a method in which the AV data to be copied is temporarily stored in the data recording unit 13, and subsequently, the stored AV data is copied to the storage medium of the dubbing destination. However, the copy creation method is not limited to this, and may be a method, for example, in which two storage media are inserted into the data recording apparatus 101 at the same time, and the AV data is directly copied between these two storage media.

Next, when the copy of the AV data to the storage medium of the dubbing destination is terminated, the dubbing management information management unit 14 subtracts 1 from the value of the remaining number of times (the remaining number of times of dubbing) in the dubbing management information corresponding to the AV data (S1703), and determines whether the remaining number of times of dubbing after the subtraction by 1 is 0 (zero), or 1 or greater (S1704).

In the case where the value of the remaining number of times of dubbing is 1 or greater in S1704, the dubbing management information management unit 14 terminates the dubbing processing (S1707). On the other hand, in the case where the remaining number of times of dubbing is 0, the media determination unit 18 determines whether the media type of the storage medium of the dubbing source is a write-once read-many storage medium, or a rewritable storage medium (S1705).

In the case where the storage medium of the dubbing source is determined to be a write-once read-many storage medium by the media determination unit 18, the media recording unit 17 terminates the dubbing processing (S1707). On the other hand, in the case where the storage medium of the dubbing source is determined to be a rewritable storage medium, the media recording unit 17 deletes the AV data the storage medium of the dubbing source (S1706), and subsequently terminates the dubbing processing (S1707).

In the above manner, the data recording apparatus 101 performs the dubbing processing from the certain storage medium to another storage medium.

Next, the move processing from a certain storage medium to another storage medium is described using FIG. 18. FIG. 18 is a flowchart showing the flow of the move processing from the certain storage medium to another storage medium in Embodiment 1.

In FIG. 18, when a user first instructs the data recording apparatus 101 to move the AV data recorded in an external storage medium, the data recording apparatus 101 starts the move processing (S1801). The media recording unit 17 copies the AV data from the certain storage medium which holds the AV data as the move source to another storage medium as the move destination which is newly inserted into the media recording unit 17 (S1802). Then after the copy is completed, the media recording unit 17 deletes the AV data from the storage medium of the move source (S1803).

Next, when the AV data is deleted from the storage medium of the move source, the dubbing management information management unit 14 updates the media type of the dubbing management information corresponding to the AV data from the media type of the storage medium of the move source to the media type of the storage medium of the move destination (S1804). The dubbing management information management unit 14 then determines whether the media type after the update is a write-once read-many storage medium, or a rewritable storage medium (S1805).

In the case where the media type after the update is determined to be a rewritable storage medium, the dubbing management information management unit 14 terminates the move processing (S1807). On the other hand, in the case where the media type after the update is determined to be a write-once read-many storage medium, the dubbing management information management unit 14 subtracts 1 from the value of the remaining number of times of dubbing in the dubbing management information corresponding to the AV data (S1806), and subsequently terminates the move processing (S1807).

In the above manner, the data recording apparatus 101 performs the move processing from the certain storage medium to another storage medium.

As described above, the data recording apparatus 101 according to Embodiment 1 can manage the information related to the permitted number of times of dubbing of AV data supported for multiple times dubbing according to the type of the storage medium regardless of whether the storage medium is a rewritable storage medium or a non-rewritable write-once read-many storage medium.

Specifically, the data recording apparatus 101 according to Embodiment 1, determines whether the storage medium is non-rewritable or rewritable by the media determination unit 18, and the dubbing management information management unit 14 accordingly manages the remaining permitted number of times of dubbing. The display unit 15 then displays the remaining permitted number of times of dubbing according to the storage medium type difference. Thereby, a user can precisely recognize the remaining permitted number of times of dubbing, i.e., the remaining number of times of copying without paying attention to the difference in type of the storage medium.

According to the present invention, a data recording apparatus capable of managing the information related to the permitted number of times of dubbing of AV data according to the type of a storage medium can be achieved.

In Embodiment 1, the case of dubbing or moving AV data between the data recording unit 13 and the storage medium connected or inserted to the media recording unit 17 that are included in the data recording apparatus 101 has been described as an example; however, the invention is not limited to this.

For example, the data recording apparatus 101 may be mutually connected to another data recording apparatus instead of a storage medium, such as a DVD-RAM drive apparatus, a DVD-R drive apparatus, and an HDD drive apparatus via a network. In this case, the data recording apparatus 101 may be configured to be able to transmit the AV data recorded in the data recording unit 13 to another data recording apparatus, or to receive the AV data recorded in another data recording apparatus via a network.

By this configuration, dubbing of the AV data can be performed bidirectionally to and from not only the storage medium connected or inserted to the data recording apparatus 101, but also another data recording apparatus connected to the data recording apparatus 101 via a network. In this case, however, the data recording apparatus 101 is required to be equipped with a data transmitting and receiving unit that can transmit and receive the AV data and related information to and from another data recording apparatus via a network.

In Embodiment 1, description has been given by using an example of AV data of digital broadcast content as the AV data to be recorded in the data recording apparatus 101; however, the invention is not limited to this. For example, the AV data may be the one of digital content distributed via a network, supported by a copyright protection system permitting multiple times dubbing.

In Embodiment 1, description has been given by using an example of the number of times of dubbing as a restricted use in copyright protection system; however, the invention is not limited to this. For example, restricted use such as a permitted number of times of reproduction or a permitted time period for reproduction may be applied, and it is apparent that similar effects as shown above are provided by the present invention.

Also, the present invention can provide not only a data recording apparatus provided with the above-described units, but also a data recording integrated circuit provided with the units included in the data recording apparatus, a data recording method defined by replacing the units included in the data recording apparatus by corresponding steps, and a data recording program which makes a computer execute the data recording method. And this data recording program can be distributed via a recording medium such as a CD-ROM (Compact Disc-Read Only Memory) or the Internet.

In the above, the data recording apparatus according to the present invention has been described based on Embodiment 1; however, the present invention is not limited to Embodiment 1. An embodiment made by applying various modifications which may occur to those skilled in the art to Embodiment 1, and an embodiment constructed by combining some components in different embodiments are also included in the scope of the present invention as long as those embodiments do not depart from the spirit of the present invention.

INDUSTRIAL APPLICABILITY

The present invention may be applied to a data recording apparatus, a data recording method, and a program, and particularly to a data recording apparatus to receive and record AV data from a digital terrestrial broadcast or the Internet, and, for example, to a data recording apparatus, a data recording method, and a program which operate AV data supported by a copyright protection system permitting multiple times dubbing.

REFERENCE SIGNS LIST

11 Control Unit
12 Receiving Unit
13 Data recording Unit
14 Dubbing management information management unit
15 Display unit
16 Input unit
17 Media recording unit
18 Media determination unit
101 Data recording apparatus
111, 112, 113, 114, 115, 116, 117, 118, 119, 120 Storage media
201 Rewritable storage medium
211, 212, 213, 214, 215, 216, 217, 218, 219, 220 Storage media
301 Write-once read-many storage medium
311, 312, 313, 314, 315, 316, 317, 318, 319, 320 Storage media
401, 601, 801 Screen
402, 502, 602, 702, 802 AV data list
403 Operation instruction display area
404 OK button
405 CANCEL button

The invention claimed is:

1. A data recording apparatus comprising:
a record holding unit configured to record and hold Audio and Visual (AV) data supported by a copyright protection system permitting multiple times dubbing;
a media recording unit configured to perform dubbing or moving of AV data between at least one storage medium which is portable with a capacity capable of storing AV data, and said record holding unit, or between the storage medium and another storage medium different from the storage medium;
a dubbing management unit configured to manage dubbing management information for the AV data, said dubbing management information including a permitted number of times of dubbing which is assigned in accordance with the copyright protection system; and
a media determination unit configured to determine whether a storage medium is rewritable or non-rewritable based on the media type of the storage medium which is a destination of dubbing or moving of the AV data performed by said media recording unit,
wherein said dubbing management unit is configured to update the dubbing management information corresponding to the AV data according to the determination result, when said media recording unit moves the AV data from said record holding unit to the storage medium, and
in the case where said media recording unit determines that the storage medium is rewritable based on the media type of the storage medium, said dubbing management unit updates the dubbing management information according to the determination result by maintaining the value of the permitted number of times of dubbing corresponding to the AV data while performing the move by said media recording unit.

2. The data recording apparatus according to claim 1, wherein in the case where said media recording unit determines that the storage medium is non-rewritable based on the media type of the storage medium, said dubbing management unit updates the dubbing management information according to the determination result by subtracting at least 1 from the value of the permitted number of times of dubbing corresponding to the AV data while performing the move by said media recording unit.

3. The data recording apparatus according to claim 2, wherein said dubbing management unit is configured to subtract 1 from the value of the permitted number of times of dubbing based on the determination result.

4. The data recording apparatus according to claim 1, further comprising
a data transmitting and receiving unit configured to transmit and receive AV data recorded in said record holding unit to and from another data recording apparatus connected to each other via a network,
wherein dubbing or moving of the AV data between said record holding unit or the storage medium and a record holding unit provided to the another data recording apparatus is performed via the network.

5. The data recording apparatus according to claim 1, wherein in the case where the move is performed in the data recording apparatus by said media recording unit from the storage medium in which the AV data is stored to a first storage medium different from the storage medium,
said media determination unit determines whether the first storage medium is rewritable or non-rewritable based on a media type of the first storage medium;
said media recording unit performs moving of the AV data from the storage medium to the recording holding unit so that the recording holding unit holds the AV data, and performs moving of the AV data from said record holding unit to the first storage medium; while
in the case where said media recording unit determines that the storage medium is non-rewritable based on the media type of the storage medium, said dubbing management unit updates the dubbing management information according to the determination result by subtracting at least 1 from the value of the permitted number of times of dubbing corresponding to the AV data.

6. A data recording method for a data recording apparatus, comprising:
recording and holding AV data supported by a copyright protection system permitting multiple times dubbing in a recording medium provided to the data recording apparatus;
performing dubbing or moving of AV data between at least one storage medium which is portable with a capacity capable of storing AV data, and the recording medium, or between the storage medium and another storage medium different from the storage medium;
managing dubbing management information for the AV data, the information including the permitted number of times of dubbing which is assigned in accordance with the copyright protection system; and
determining whether the storage medium is rewritable or non-rewritable based on a media type of the storage medium which is a destination of dubbing or moving of the AV data in said performing dubbing or moving,
wherein in said managing, the dubbing management information corresponding to the AV data according to the determination result is updated when the AV data is moved from said record holding unit to the storage medium in said performing dubbing or moving of AV data, and in the case where it is determined in said determining that the storage medium is rewritable based on the media type of the storage medium, the dubbing management information is updated in said managing according to the determination result by maintaining the value of the permitted number of times of dubbing corresponding to the AV data while the move is performed in said performing dubbing or moving of AV data.

7. A non-transitory computer-readable medium having a program stored thereon for executing data recording in a data recording apparatus, said program causing a computer to execute:

recording and holding AV data supported by a copyright protection system permitting multiple times dubbing in a recording medium provided to the data recording apparatus;

performing dubbing or moving of AV data between at least one storage medium which is portable with a capacity capable of storing AV data, and the recording medium, or between the storage medium and another storage medium different from the storage medium;

managing dubbing management information for the AV data, the information including the permitted number of times of dubbing which is assigned in accordance with the copyright protection system; and determining whether a storage medium is rewritable or non-rewritable based on the media type of the storage medium which is a destination of dubbing or moving of the AV data performed in said performing dubbing or moving, wherein in said managing dubbing management information, the dubbing management information corresponding to the AV data according to the determination result is updated when the AV data is moved from said record holding unit to the storage medium in said performing dubbing or moving of AV data, and in the case where it is determined in said determining that the storage medium is rewritable based on the media type of the storage medium, the dubbing management information is updated in said managing according to the determination result by maintaining the value of the permitted number of times of dubbing corresponding to the AV data while the move is performed in said performing dubbing or moving of AV data.

* * * * *